US012666062B2

(12) United States Patent
Sánchez De La Fuente et al.

(10) Patent No.: US 12,666,062 B2
(45) Date of Patent: *Jun. 23, 2026

(54) VIDEO CODING ASPECTS OF TEMPORAL MOTION VECTOR PREDICTION, INTERLAYER REFERENCING AND TEMPORAL SUBLAYER INDICATION

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/908,902

(22) Filed: Oct. 8, 2024

(65) Prior Publication Data

US 2025/0039416 A1      Jan. 30, 2025

Related U.S. Application Data

(63) Continuation of application No. 18/008,546, filed as application No. PCT/EP2021/065270 on Jun. 8, 2021, now Pat. No. 12,149,718.

(30) Foreign Application Priority Data

Jun. 9, 2020      (EP) .................................... 20179115

(51) Int. Cl.
*H04N 19/30*      (2014.01)
*H04N 19/172*      (2014.01)
(Continued)

(52) U.S. Cl.
CPC ........... *H04N 19/30* (2014.11); *H04N 19/172* (2014.11); *H04N 19/52* (2014.11); *H04N 19/70* (2014.11)

(58) Field of Classification Search
CPC ...... H04N 19/30; H04N 19/172; H04N 19/52; H04N 19/70
See application file for complete search history.

(56) References Cited

U.S. PATENT DOCUMENTS

2022/0239949 A1*  7/2022  Hannuksela ......... H04N 19/105
2023/0224470 A1*  7/2023  Hendry ................ H04N 19/159
                                              375/240.02

FOREIGN PATENT DOCUMENTS

KR      20170019344 A      2/2017

OTHER PUBLICATIONS

Sanchez, et al., "AHG9: On OLS and sublayers", Joint Video Experts Team (JVET) of ITU-T SG 16 WP 3 and OSO/IEC JTC 1/SC 29/WG 11 JVET-S0100 19th Meeting: by teleconference Jun. 22-Jul. 1, 2020, 5 pages.

(Continued)

*Primary Examiner* — Jonathan R Messmore
(74) *Attorney, Agent, or Firm* — Sage Patent Group

(57) ABSTRACT

Concepts for a video coding are described. A first aspect provides a concept for determining an interlayer reference picture for inter-predicting a picture of a multi-layered video data stream. A second aspect provides a concept for the usage of an interlayer prediction tool in multi-layered video data streams. A third aspect is concerned with a determina- (Continued)

Figure 1:
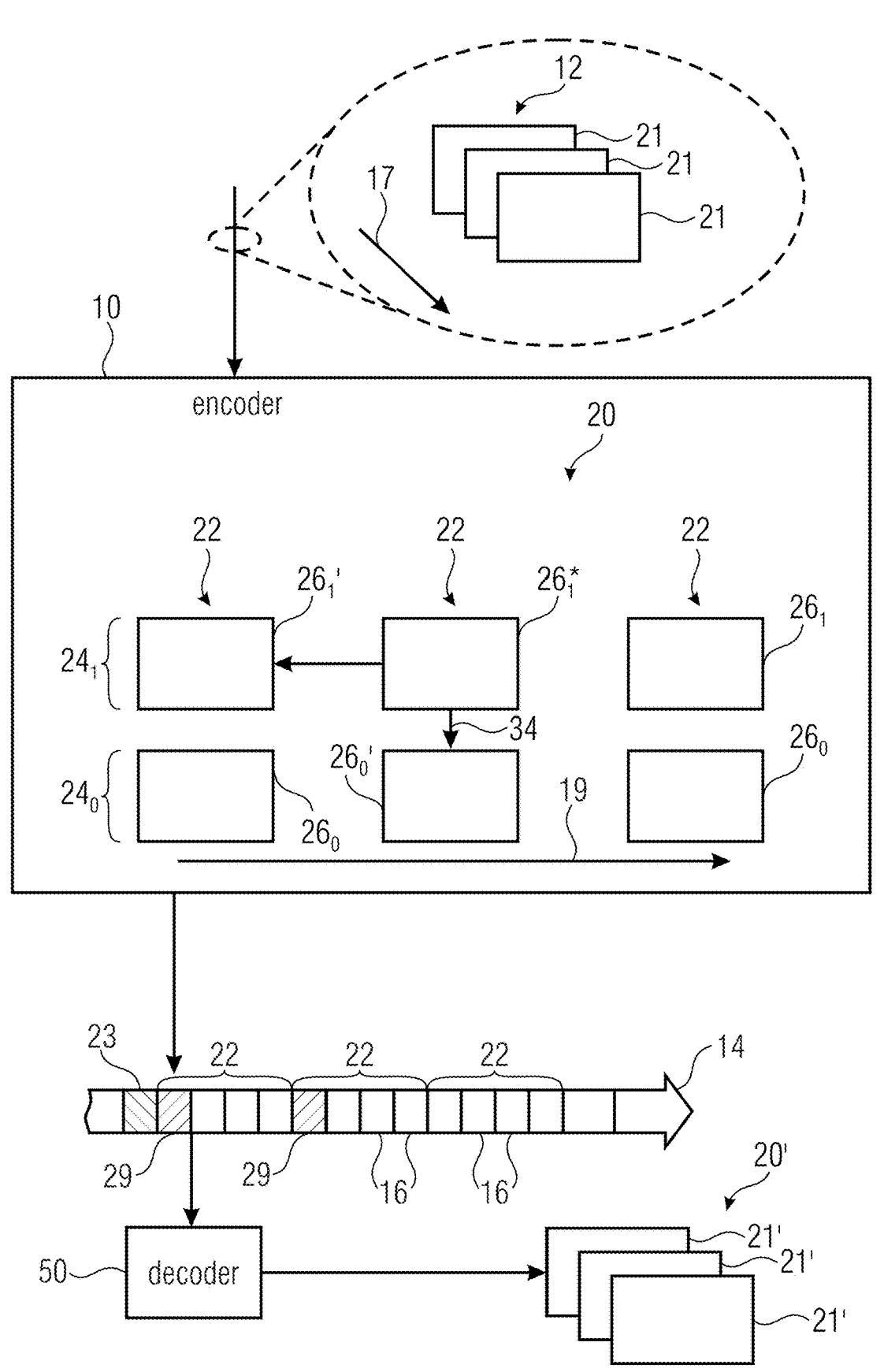

tion of a maximum temporal sublayer of an OLS or a maximum temporal sublayer to be decoded.

15 Claims, 9 Drawing Sheets

(51) Int. Cl.
    *H04N 19/52*     (2014.01)
    *H04N 19/70*     (2014.01)

(56)            References Cited

OTHER PUBLICATIONS

International Search Report for PCT/EP2021/065270 dated Oct. 21, 2021, 5 pages.

Written Opinion of the ISA for PCT/EP2021/065270 dated Oct. 21, 2021, 17 pages.

Chen et al., "AHG9: On syntax signaling conditions in picture header", 130. MPEG Meeting; Apr. 20, 2020-Apr. 24, 2020; Albach; (Motion Picture Expert Group or ISO/I EC JTCI/SC29/WG11), No. m53308; JVET-R0324, Apr. 16, 2020, 5 pages.

Bross, et al., "Versatile Video Coding (Draft 9)", 130. MPEG Meeting; Apr. 20, 2020-Apr. 24, 2020; Alpbach; (Motion Picture Expert Group or ISO/IEC JTCI/SC29/WG11), No. JVET-R2001-vA; m53983; JVET-R2001, May 15, 2020, pp. 1-524.

Sullivan, "Agenda and [Draft] report of the May 27-28, 2020 HLS AHG meeting", 131. MPEG MEETING; Jun. 29, 2020-Jul. 3, 2020; (Motion Picture Expert Group or ISO/IEC JTC1/SC29/WG11), No. m54123; JVET-S0137, May 29, 2020, 47 pages.

Sullivan, "Agenda and report of the Jun. 19-21, 2020 HLS AHG pre-meeting", 131. MPEG MEETING; Jun. 29, 2020-Jul. 3, 2020; (Motion Picture Expert Group or ISO/IEC JTC1/SC29/WG11), No. m54245; JVET-S0237, Jun. 23, 2020, 91 pages.

Skupin, et al., "AHG9: Miscellaneous cleanups", 131.MPEG Meeting; Jun. 29, 2020-Jul. 3, 2020; Online; (Motion Picture Expert Group or ISO/IEC JTC1/SC29/WG11), No. m54182; JVET-S0174, Jun. 22, 2020, 4 pages.

Chen et al., "AHG9: on RPL syntax and semantics", 131 MPEG Meeting; Jun. 29, 2020-Jul. 3, 2020; Online; (Motion Picture Expert Group or ISO/IEC JTC1/SC29/WG11), No. m54082; JVET-S00096, May 22, 2020, 6 pages.

* cited by examiner

VIDEO CODING ASPECTS OF TEMPORAL MOTION VECTOR PREDICTION, INTERLAYER REFERENCING AND TEMPORAL SUBLAYER INDICATION

This application is a Continuation of U.S. application Ser. No. 18/008,546, filed Dec. 6, 2022, which is the U.S. national phase of International Application No. PCT/EP2021/065270 filed Jun. 8, 2021 which designated the U.S. and claims priority to EP Application Serial No. 20179115.9 filed Jun. 9, 2020, the entire contents of each of which are hereby incorporated by reference.

Embodiments of the present disclosure relate to video encoders, video decoders, methods for encoding a video sequence into a video bitstream, and methods for decoding a video sequence from a video bitstream. Further embodiments relate to video bitstreams.

In the encoding or decoding of a picture of a video sequence prediction is used to reduce the amount of information, which is to be signaled in the video bitstream into which or from which the picture is encoded/decoded. Prediction may be used for the image data itself, such as sample values or coefficients into which sample values of the picture are coded. Alternatively or additionally, prediction may be used for syntax elements used in the coding of the picture, for example, motion vectors. For predicting a motion vector for a picture, which is to be coded, a reference picture may be selected from which a predictor for a motion vector for the picture to be coded is determined.

A first aspect of the present disclosure provides a concept for selecting the reference picture used for temporal motion vector prediction. Two lists of reference pictures for a predetermined picture, e.g., the picture to be coded, are populated, wherein each of the lists may be either empty or not. The TMVP reference picture is determined by selecting one out of the two lists of reference pictures as a TMVP picture list and select the TMVP reference picture out of the TMVP picture list. According to the first aspect, in cases in which one of the two lists is empty and the other one is not empty, a reference picture from the non-empty list is used for temporal motion vector prediction (TMVP). Accordingly, independent of which of the two lists is empty, TMVP may be used, such providing for a high coding efficiency in both cases, either only the first list or only the second list being empty.

A second aspect of the present disclosure is based on the idea that tree root blocks into which a picture of a coded video sequence is partitioned, are smaller than, or equal to, in size that tree root blocks into which a reference picture of the picture is partitioned. Imposing such a constraint onto the portioning of pictures into tree root blocks may ensure that the dependency of the picture on the reference picture does not extend beyond boundaries of the tree root block, or at least not beyond a row boundary of row of the tree root blocks. Accordingly, the constraint may limit the dependencies between different tree root blocks, providing benefits in the buffer management. In particular, dependencies between tree root blocks of different rows of tree root blocks may result in inefficient buffer usage, as neighboring tree root blocks belonging to different rows may be separated by further tree root blocks in the coding order. Thus, avoiding such dependencies may avoid a requirement of keeping the entire row of tree root blocks between the currently coded tree root block and the referenced tree root block.

A third aspect of the present disclosure provides a concept for determining a maximum temporal sublayer up to which layers of an output layer set indicated in a multi-layered video bitstream are to be decoded. Thus, the concept allows a decoder for determining which portion of the video bitstream to decode in absence of an indication for a maximum temporal sublayer to be decoded. Additionally, the concept allows an encoder to omit a signaling of the indication for a maximum temporal sublayer to be decoded if the maximum temporal sublayer to be decoded corresponds to the one inferred by the decoder in absence of the respective indication, thus avoiding an unnecessarily high signaling overhead.

Figure 2:
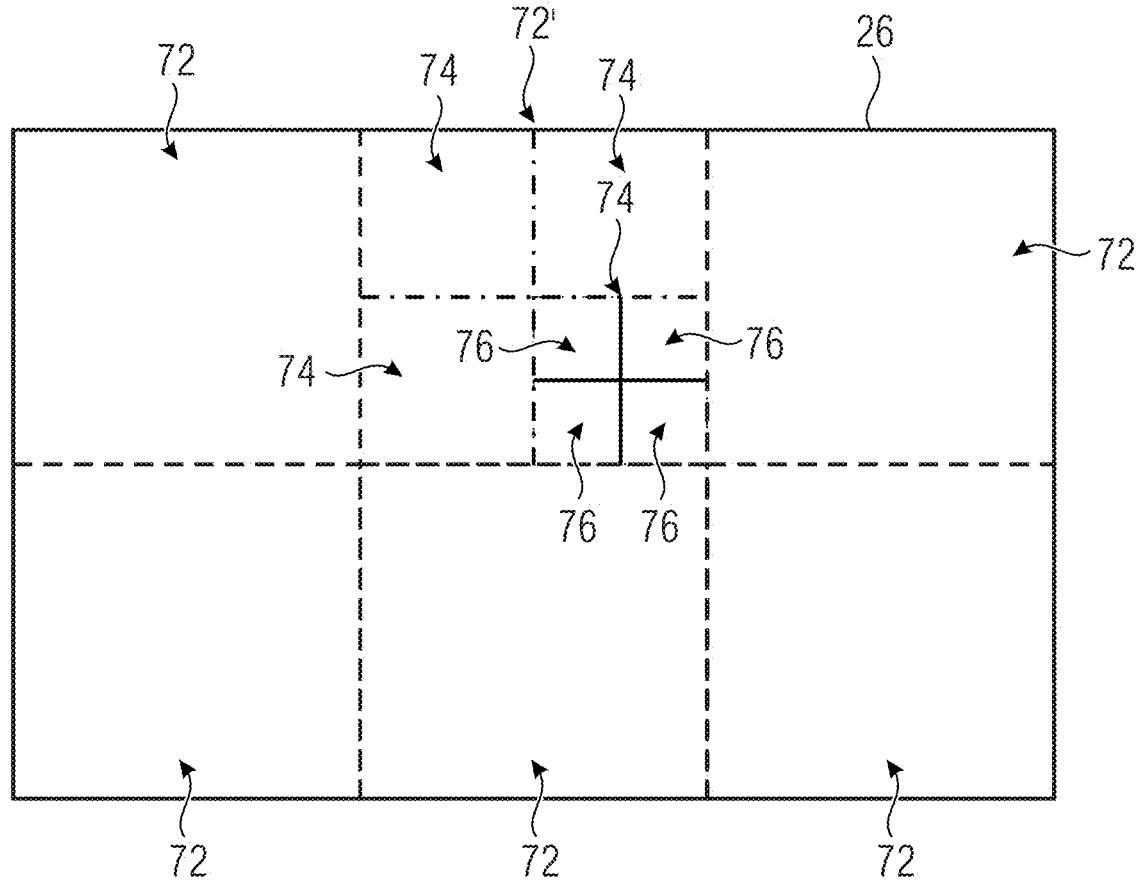
Figure 3:
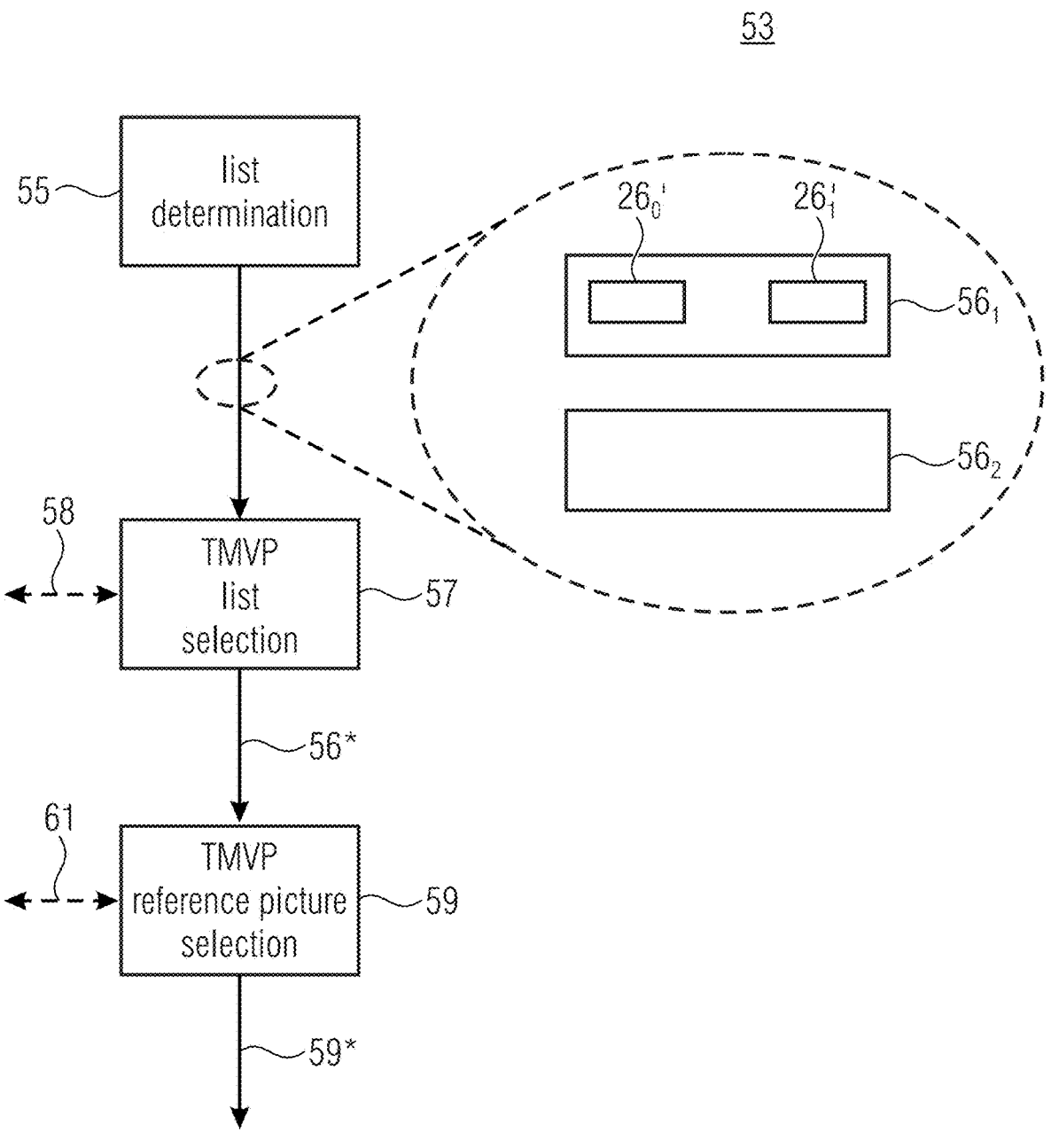
Figure 4:
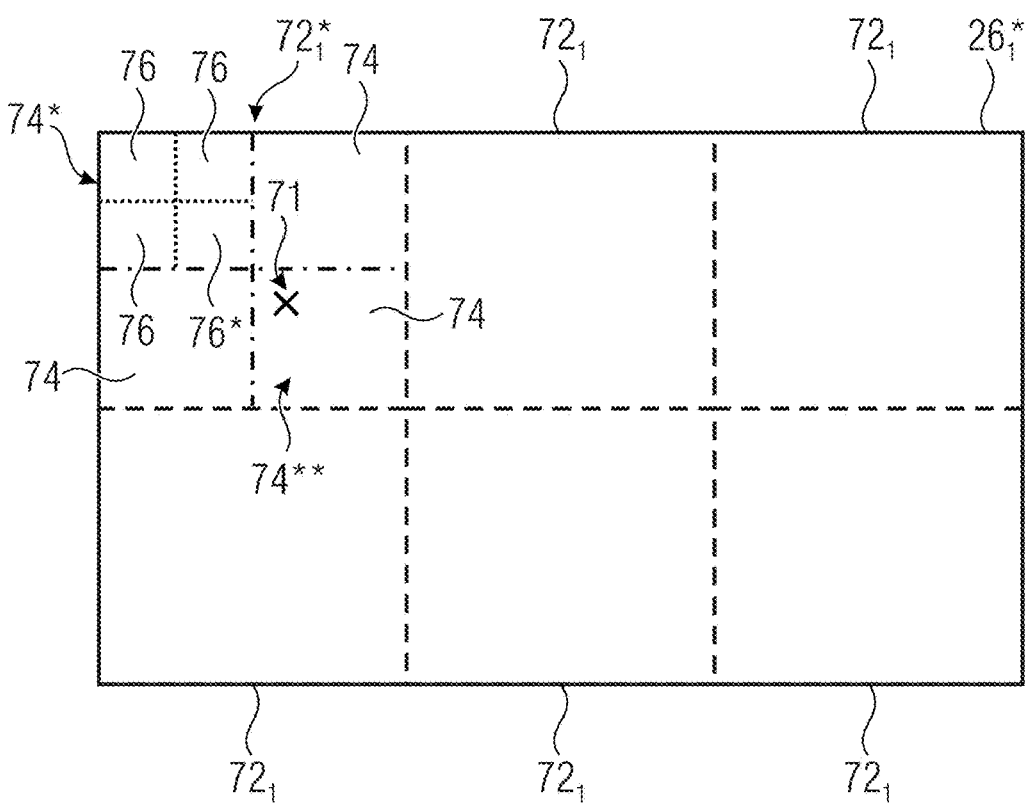
Figure 4:
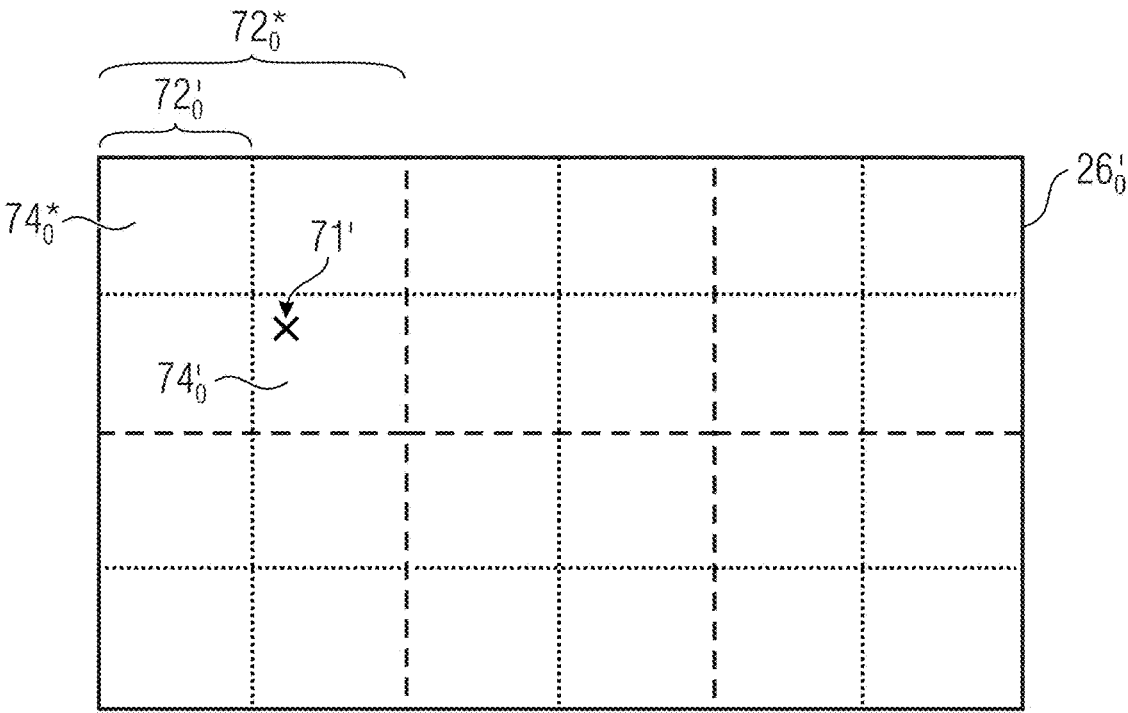
Figure 5:
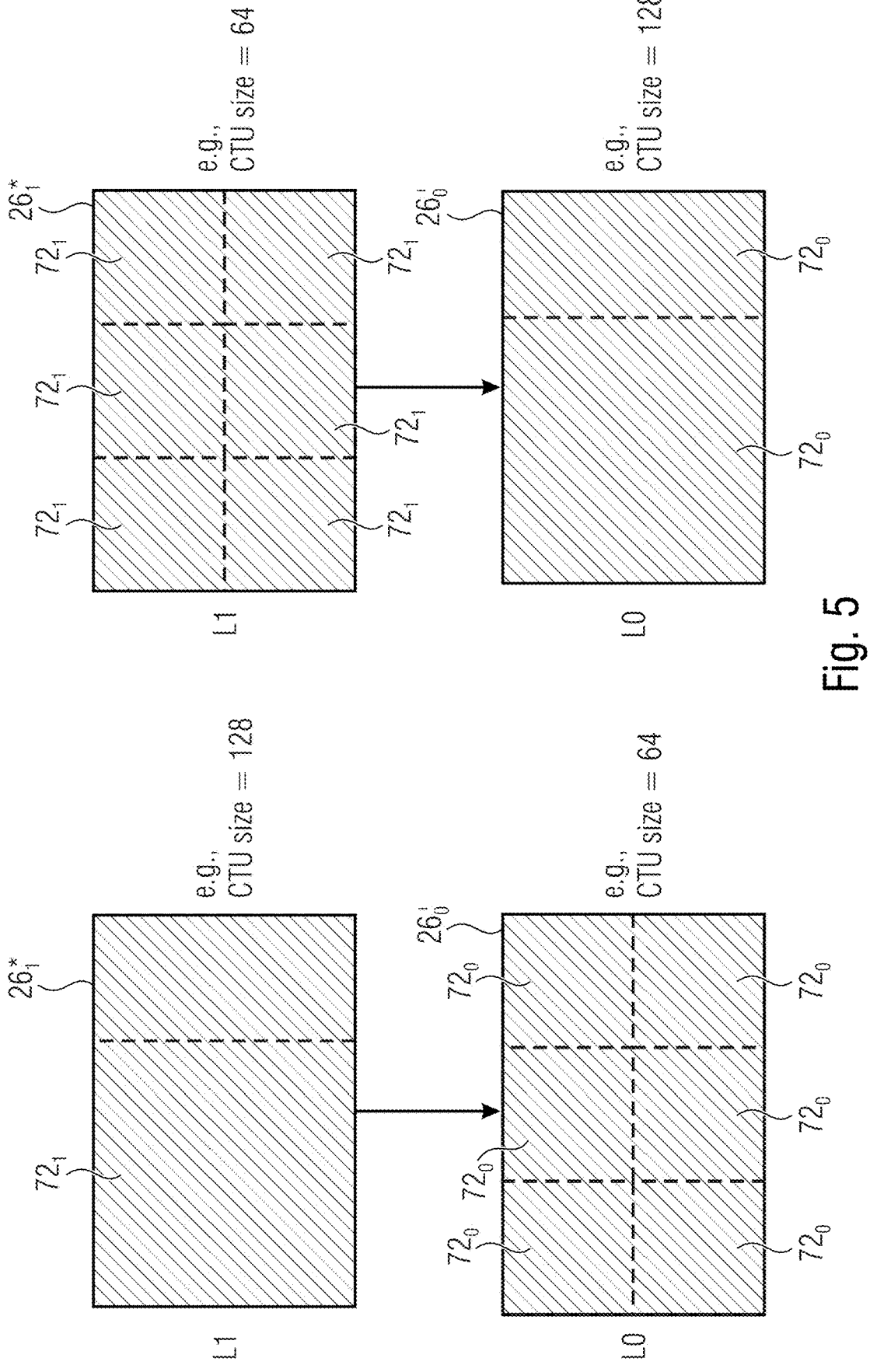
Figure 6:
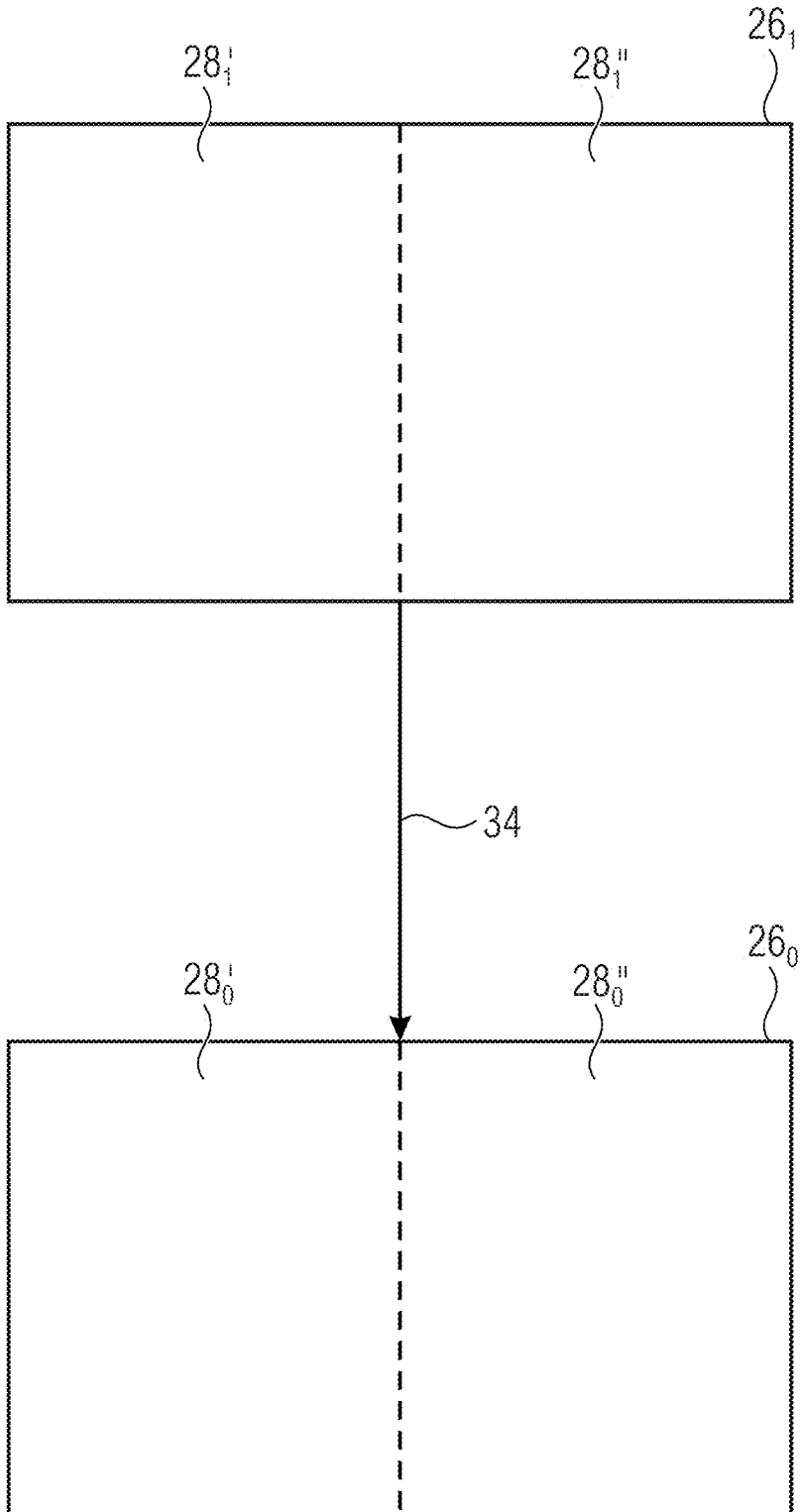
Figure 7:
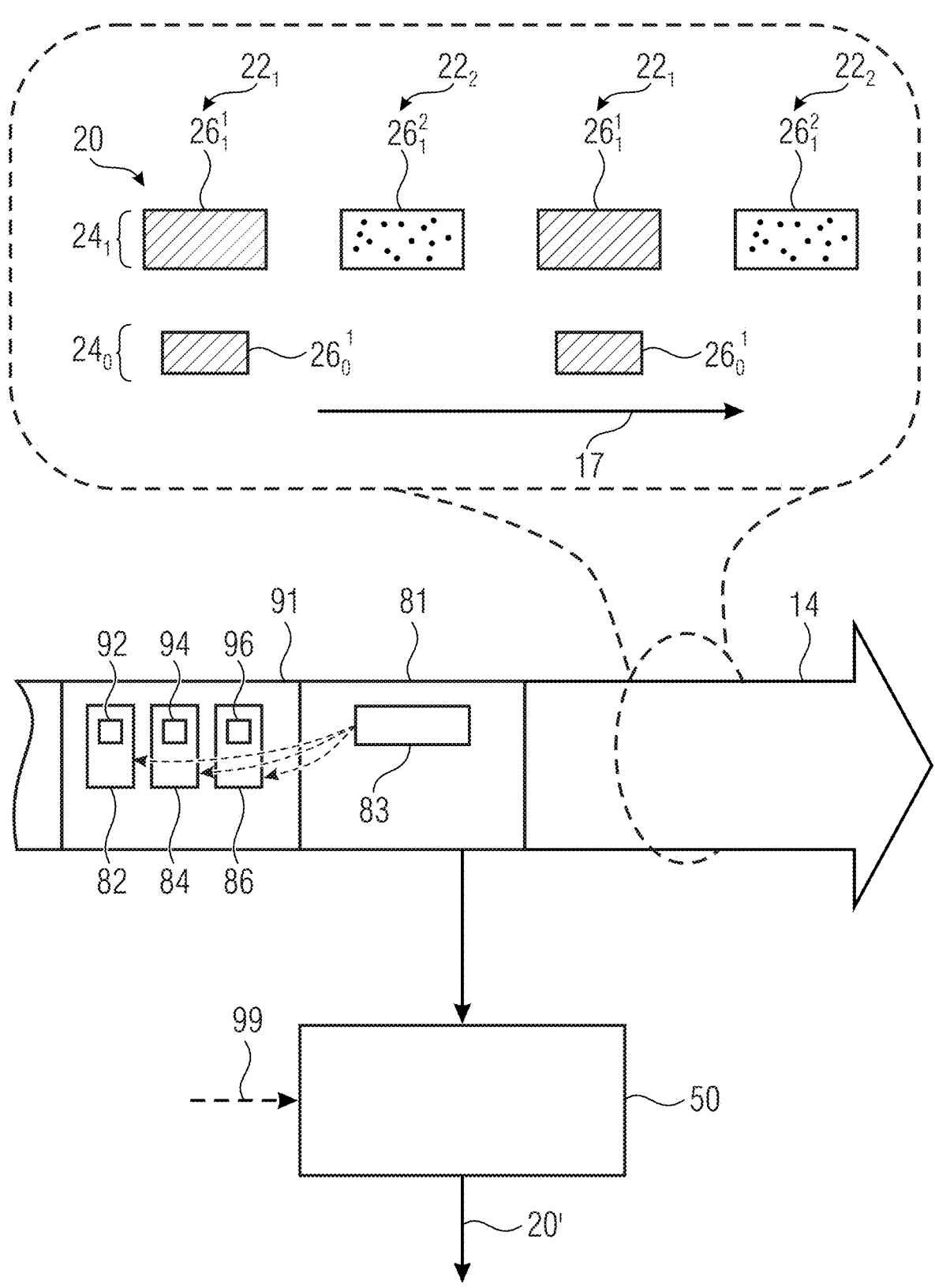
Figure 8:
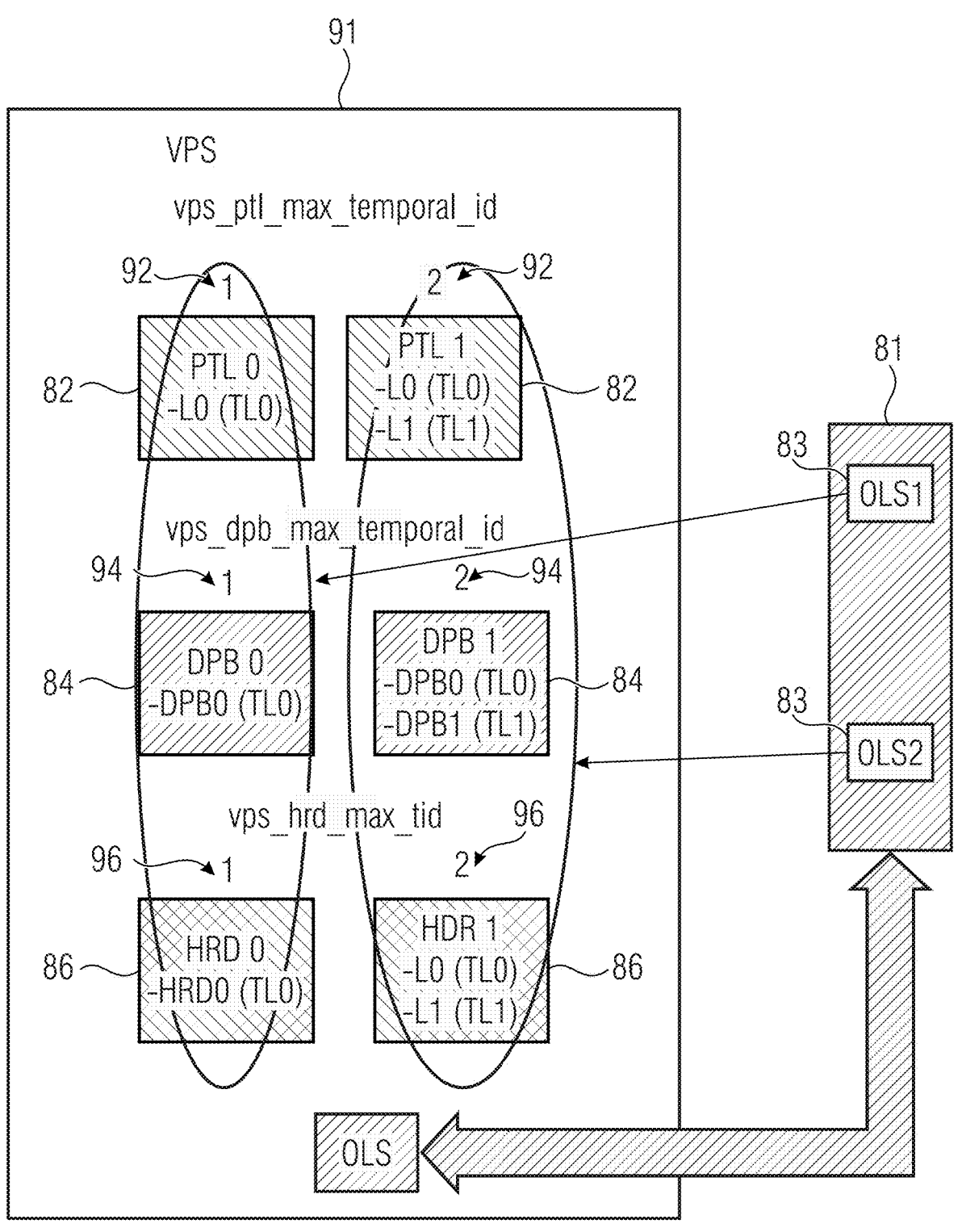
Figure 9:
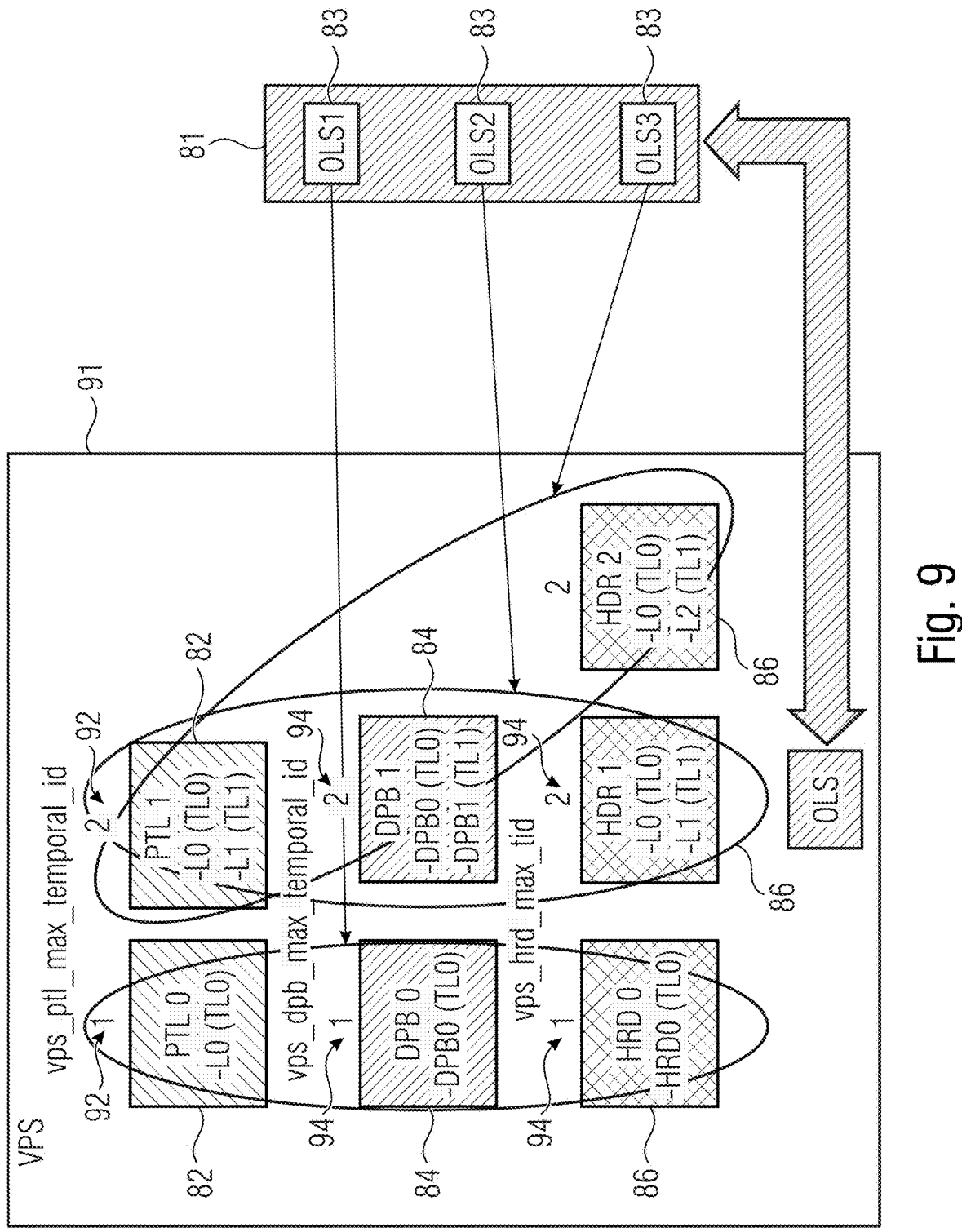

Embodiments and advantageous implementations of the present disclosure are described in more detail below with respect to the figures, among which:

FIG. 1 illustrates an encoder, a decoder and a video bitstream according to embodiments, FIG. 2 illustrates an example of a subdivision of a picture, FIG. 3 illustrates a determination of a TMVP reference picture according to an embodiment, FIG. 4 illustrates an example of a determination of a motion vector candidate in dependence on tree root partitioning, FIG. 5 illustrates two examples of different tree root block sizes in dependent and reference layers, FIG. 6 illustrates an example of a subpicture sub-division of dependent and reference layers, FIG. 7 illustrates a decoder and a video bitstream according to embodiments of the third aspect, FIG. 8 illustrates an example of a mapping between output layer sets and a video parameter set, FIG. 9 illustrates an example of a mapping between output layer sets and video parameter sets with sharing of parameters.

In the following, embodiments are discussed in detail, however, it should be appreciated that the embodiments provide many applicable concepts that can be embodied in a wide variety of video coding concepts. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same reference numbers or being identified with the same names are mutually exchangeable or may be applied to one another in the different embodiments.

The detailed description of embodiments of the disclosed concepts starts with the description of examples of an encoder, a decoder, and a video bitstream which examples provide a framework into which embodiments of the present invention may be built in. Thereinafter, the description of embodiments of the concept of the present invention is presented along with a description as to how such concepts could be built into the encoder, the decoder of FIG. 1.

Although, the embodiments described with respect to the subsequent FIG. 2 and following may also be used to form an encoder and a decoder not operating according to the framework described with respect to FIG. 1. It is further noted that the encoder and the decoder may be implemented separately from each other, although they are jointly described in FIG. 1 for illustrative purpose. It is further noted, that the encoder and the decoder may be combined within one apparatus, or that one of the two may be implemented to be part of the other one. Also, some of the embodiments of the invention are described with reference to FIG. 1.

FIG. 1 illustrates examples of an encoder 10 and a decoder 50. Encoder 10 (which may also be referred to as apparatus for encoding) encodes a video sequence 12 into a video bitstream 14 (which may also be referred to as bitstream, data stream, video data stream, or stream). The video sequence 12 includes a sequence of pictures 21, the pictures 21 being arranged in a presentation order or picture order 17. In other words, each of the pictures 21 may represent frame of the video sequence 12 and may be associated with a time instant of a presentation order of the video sequence 12. On the basis of the video sequence 12, encoder 10 may encode, into the video bitstream 14, a coded video sequence 20. Encoder 10 may form the coded video sequence 20 in the form of access units 22, each of the access units 22 having encoded thereinto video data belonging to a common time instant. In other words, each of the access units 22 may have encoded thereinto one of the pictures 21, i.e., one of the frames, of the video sequence 12. Encoder 10 encodes the coded video sequence 20 according to a coding order 19, which may differ from the picture order 17 of the video sequence 12.

Encoder 10 may encode the coded video sequence 20 into one or more layers. That is, video bitstream 14 may be a single layered or a multi-layered video bitstream comprising one or more layers. Each of the access units 22 includes one or more coded pictures 26 (e.g., pictures $26_0$, $26_1$ in FIG. 1, wherein apostrophes and stars are used for referencing specific ones, and subscript indices indicate the layer to which the pictures belong). Each of the pictures 26 belongs to one of layers 24, e.g., layer $24_0$, $24_1$ of FIG. 1, of the coded video sequence. In FIG. 1, an exemplarily number of two layers is shown, namely a first layer $24_1$ and a second layer $24_0$. In embodiments according to the disclosed concepts, the coded video sequence 20 and the video bitstream 14 do not necessarily include multiple layers, but may include 1, 2 or more layers. In the example of FIG. 1, each of the access units 22 includes a coded picture $26_1$ of the first layer $24_1$ and a coded picture $26_0$ for the second layer $24_0$. It is noted, however, that each of the access units 22, but not necessarily, may include a coded picture for each of the layers of the coded video sequence 20. For example, layers $24_0$, $24_1$ may have different frame rates (or picture rates) and/or may include pictures for complementary subsets of access units of the access units 22.

As mentioned before, the pictures $26_0$, $26_1$ of one of the access units represent image content of the same time instant. For example, pictures $26_0$, $26_1$ of the same access unit 22 may represent the same image content at different qualities, e.g., resolution or fidelity. In other words, layer $24_0$ may represent a first version of the coded video sequence 20 and a layer $24_1$ may represent a second version of the coded sequence 20. Thus, a decoder, such as decoder 50, or an extractor, may select between different versions of the coded video 15 sequence 20 to be decoded or extracted from the video bitstream 14. For example, layer $24_0$ may be decoded independently from further layers of the coded video sequence, providing for a decoded video sequence of a first quality, while a joint decoding of the first layer $24_1$ and the second layer $24_0$ may provide for a decoded video sequence of a second quality, which is higher than the first quality. For example, the first layer $24_1$ may be encoded independence on the second layer $24_0$. In other words, the second layer $24_0$ may be a reference layer for the first layer $24_1$. For example, in this scenario, the first layer $24_1$ may be referred to as enhancement layer and the second layer $24_0$ may be referred to as a base layer. Pictures $26_0$ may have a smaller picture size, an equal picture size or a larger picture size than the pictures $26_1$. For example, the picture size may refer to a number of samples in a two dimensional array of a picture. It is noted that pictures $26_0$, $26_1$ do not necessarily have to represent an equal image content, but, for example, pictures $26_1$ may represent an excerpt of the image content of pictures $26_0$. For example, in some scenarios, different layers of the video bitstream 14 may include different subpictures of pictures coded into the video bitstream.

Encoder 10 encodes the access units 22 into bitstream portions 16 of the video bitstream 14. For example, each of the access units 22 may be encoded into one or more bitstream portions 16. For example, a picture 26 may be subdivided into tiles of slices, and each of the slices may be encoded into one bitstream portion 16. Bitstream portions 16, into which the pictures 26 are encoded may be referred to as video coded layer (VCL) NAL units. The video bitstream 14 may further include non-VCL NAL units, e.g., bitstream portions 23, 29, into which descriptive data is coded. The descriptive data may provide information for decoding or information about the coded video sequence 20. Bitstream portions into which descriptive data is encoded may be associated with individual bitstream portions, e.g. they may refer to individual slices, or they may be associated with one of the pictures 26, or one of the access units 22, or may be associated with a sequence of access units, i.e., relate to the coded video sequence 20. It is noted that the video 12 may be coded into a sequence of coded video sequences 20.

Decoder 50 (which may also be referred to as apparatus for decoding) decodes the video bitstream 14 so as to obtain a decoded video sequence 20'. It is noted that the video bitstream 14 provided to decoder 50 does not necessarily correspond to the video bitstream 14 provided by an encoder, but may have been extracted from a video bitstream provided by an encoder so that the video bitstream decoded by decoder 50 may be a sub bitstream of a video bitstream encoded by an encoder such as encoder 10. As mentioned before, decoder 50 may decode the entire coded video sequence 20 coded into video data stream 14, or may decode a portion thereof, e.g., a subset of layers of the coded video sequence 20 and/or a temporal subset of the coded video sequence 20 (i.e., a video sequence having a lower frame rate than the maximum frame rate provided by the video sequence 20). Thus, the decoded video sequence 20' does not necessarily correspond to the video sequence 12 encoded by encoder 10. It is also noted that the decoded video sequence 20' may further differ from the video sequence 12 due to coding losses, such as quantization loss.

The pictures 26 may be encoded using prediction tools for predicting the signal or the coefficients representing the picture in the video bitstream 14 from previously coded pictures. That is, encoder 10 may use the prediction tools for encoding a predetermined picture 26\*, e.g. a picture which is currently to be encoded using previously encoded pictures. Correspondingly, decoder 50 may use the prediction tools for predicting a picture 26\* to be currently decoded from previous decoded pictures. In the following description, a predetermined picture or block, e.g. the currently coded picture or block, will be referenced using the (*) in the reference sign. E.g., picture $26_1^*$ in FIG. 1 is considered as the currently coded picture, wherein the currently coded picture 26* may equivalently refer to the currently encoded picture encoded by encoder 10 and the currently decoded picture in the decoding process performed by decoder 50.

Prediction of a picture from other pictures of the coded video sequence 20 may also be referred to as inter-prediction. For example, picture $26_1^*$ may be encoded using temporal inter-prediction from picture $26_1{}'$ which belongs to a different one of the access units than picture $26_1^*$. Thus, picture $26_1^*$ may include a reference 32 to a picture $26_1{}'$ belonging to the same layer but to another access unit than the picture $26_1^*$. Additionally or alternatively, picture $26_1^*$ may be predicted using inter-layer (inter-) prediction from a picture of another layer, e.g., a lower layer (lower by means of layer indices which may be associated with each of layers 24). For example, picture $26_1^*$ may include a reference 34 to picture $26_0{}'$ which belongs to the same access unit but to another layer. In other words, in FIG. 1, pictures $26_1{}'$, $26_0{}'$ may be examples of possible reference pictures for the currently coded picture $26_1^*$. It is noted that prediction may be used for predicting coefficients of the pictures themselves, such as in the determination of transform coefficients signaled in the video bitstream 14, or may be used for prediction of syntax elements, which are used in the encoding of the pictures. For example, pictures may be encoded using motion vectors, which may represent a motion of image content of the currently coded picture 26* with respect to previously coded pictures or previous pictures in picture order. For example, motion vectors may be signaled in the video bitstream 14. Motion vectors for picture $26_1^*$ may be predicted from a reference picture, e.g. any of the above mentioned but also alternative ones, using temporal motion vector prediction (TMVP).

The pictures 26 may be coded block wise. In other words, pictures 26 may be subdivided into blocks and/or subblocks, e.g., as described with respect to FIG. 2.

Embodiments described herein may be implemented in the context of versatile video coding (VVC) or other video codecs.

In the following, several concepts and embodiments will be described making reference to FIG. 1, and features described with respect to FIG. 1. It is pointed out that features described with respect to an encoder, a video bitstream, or a decoder shall be understood to be also a description of the others of these entities. For example, a feature which is described to be present in a video data stream shall be understood as a description of an encoder being configured to encode this feature into a video bitstream and a decoder or an extractor being configured to read the feature from the video bitstream. It is further pointed out that inference of information based on indications coded into the video bitstream may equally be performed on encoder and decoder side. It is further noted that the features described with respect to the individual aspects may optionally be combined with each other.

FIG. 2 illustrates an example of a splitting of one of the pictures 26 into blocks 74 and subblocks 76. For example, pictures 26 may be pre-divided into tree-root blocks 72, which in turn may be subject to recursive sub-division, as exemplarily illustrated for the tree-root block 72', which is one of the tree-root blocks 72, in FIG. 2. That is, the tree-root blocks 72 may be subdivided into blocks, which blocks may in turn be subdivided into subblocks and so forth. The recursive subdividing may be referred to as multi tree splitting. The tree-root blocks 72 may be rectangular, and may optionally be quadratic. The tree-root blocks 72 may be referred to as coding tree units (CTU).

For example, the above mentioned motion vectors (MV) may be determined, and optionally be signaled in the video bitstream 14, block-wise or subblock-wise. In other words, a motion vector may refer to an entire block 74, or to a subblock 76. For example, for each block 74 of pictures 26, a motion vector may be determined. Alternatively, a motion vector may be determined for each of subblocks 76 of a block 74. In examples, it may differ from block to block whether one motion vector is determined for the entire block 74 or whether one motion vector for each of subblocks 76 of the block 74 is determined. For example, all pictures of the coded video sequence 20, belonging to the same of the layers 24 may be partitioned into tree root blocks of equal size.

Embodiments according to the first and the second aspects may relate to temporal motion vector prediction.

FIG. 3 illustrates a TMVP reference picture determination module 53, named TMVP module 53 in the following, according to embodiments of the first aspect, which may optionally also be implemented in embodiments of the second and thirds aspects. The TMVP reference picture determination module 53 may be implemented in a video decoder supporting TMVP, e.g., a video decoder configured to decode a sequence of coded pictures from a data stream, for example, decoder 50 of FIG. 1. TMVP module 53 may also be implemented in a video encoder supporter TMVP, for example, a video encoder configured to decode a sequence of pictures into a data stream, for example, encoder 10 of FIG. 1. Module 53 is for determining a TMVP reference picture 59* for a predetermined picture, e.g., the currently coded picture 26*. For example, the TMVP reference picture for the predetermined picture 26* is a reference picture of the predetermined picture 26*, from which reference picture a predictor for a motion vector for the predetermined picture 26* is selected.

For determining the TMVP reference picture 59*, TMVP module 53 determines a first list $56_1$ and a second list $56_2$ of reference pictures out of a plurality of previously decoded pictures. For example, the plurality of previously decoded pictures may include pictures 26 of previously decoded access units 22, for example, picture $26_1{}'$ of FIG. 1 for the predetermined picture $26_1^*$, and may optionally also include previously decoded pictures of the same access unit as the predetermined picture 26*, such as picture $26_0{}'$ of FIG. 1, which belongs to a lower layer, namely layer $24_0$, than the predetermined picture 26*. Thus, referring to the example of FIG. 1, for example, pictures $26_0{}'$, $26_1{}'$ may be part of the first list $56_1$ of reference pictures. In other examples, these two pictures may be part of the second list of reference pictures. The first list $56_1$ may optionally comprise further reference pictures. In the example illustrated in FIG. 3, the second list $56_2$ of reference pictures is empty. It is noted, that in general, none or one or both of the first and second lists may be empty or not empty. The reference pictures out of the first and the second lists may be for inter prediction of the predetermined picture 26'. Encoder 10 may determine the first and second lists and signal them in the video bitstream 14, so that decoder 50 may derive them from the video bitstream. Alternatively, decoder 50 may determine the first and second lists independently of explicit signaling, or at least partially independently from explicit signaling. For example, encoder 10 may signal the first and second lists in the video bitstream 14.

The TMVP reference picture determination module 53 appoints one reference picture out of the first and second lists 56₁, 56₂ of reference pictures of the predetermined picture 26* as the TMVP reference picture 59* for the predetermined picture 26*, for example, if at least one of the first and second lists of reference pictures is not empty. To this end, module 53 may determine, e.g., by means of a TMVP list selection module 57, one of the first list 56₁ and the second list 56₂ of reference pictures as a TMVP picture list 56*.

For determining 57 the TMVP picture list 56*, encoder 10 may select the first list 56₁ as the TMVP picture list 56*, if the second list 56₂ of reference pictures is empty for the predetermined picture 26*. Accordingly, decoder 50 may infer that the TMVP picture list 56* is the first list 56₁ of reference pictures if the second list 56₂ of reference pictures is empty for the predetermined picture 26*. If the first list of reference pictures is empty and the second list of reference pictures is not empty, encoder 10 may select the second list 56₂ as the TMVP picture list 56*. Accordingly, decoder 50 may in this case infer that the TMVP picture list 56* is the second list 56₂ of reference pictures. If neither the first nor the second list of reference pictures is empty for the predetermined picture 26*, the TMVP list selection module 57 of the encoder 10 may select the TMVP picture list 56* out of the first list 56₁ and the second list 56₂. Encoder 10 may encode a list selector 58 into the video bitstream 14, the list selector 58 indicating which of the first and second lists is the TMVP picture list 56* for the predetermined picture 26*. For example, the list selector 58 may correspond to the ph_collocated_from_l0_flag syntax element mentioned below. Decoder 50 may read the list selector 58 from the video bitstream 14 and select the TMVP picture list 56* accordingly.

The TMVP module 53 further performs a selection 59 of the TMVP reference picture 59* out of the TMVP picture list Encoder 10 and decoder 50 may use the TMVP reference picture 59* for predicting the motion vector for the predetermined picture 26*.

For example, the TMVP list selection module 57 of decoder 50 may start the TMVP list selection by detecting whether the video bitstream 14 indicates the list indicator 58, and if so, select the TMVP picture list 56* as indicated by the list indicator 58. If the video bitstream 14 does not indicate the list selector 58, the TMVP list selection module 57 may select the first list 56₁ as the TMVP picture list 56*, if the second list 56₂ of reference pictures is empty for the predetermined picture 26*. Otherwise, and if the first list of reference pictures is empty for the predetermined picture, the TMVP list selection module 57 may select the second list 56₂ of reference pictures as the TMVP picture list 56*. Alternatively, for the case that the second list 56₂ is empty for the predetermined picture, the TMVP list selection module 57 may select the second list 56₂ as the TMVP picture list 56*, if the second list 56₂ is not empty.

In other words, embodiments of the first aspect may allow for an interference of the list selector 58, e.g., PH_collocated_from_L0, in cases in which the first list 56₁ is empty but the second list 56₂ is not empty. The first list 56₁ may also be referred to as L0 and the second list 56₂ may also be referred to as L1.

In other words, the current specification (of VVC) uses two syntax elements to control the picture used for temporal motion vector prediction (TMVP) (or subblock TMVP), namely ph_collocated_from_l0_flag and ph_collocated_ref_idx, the first one specifying whether the picture used for TMVP is chosen from L0 or L1 and the second one specifying which of the picture of the selected list is used. These syntax elements are present either in the picture header or in the slice header, in the latter case having a prefix of "sh_" instead of "ph_". The picture header is shown as an example in Table 1.

TABLE 1

| | Descriptor |
|---|---|
| picture_header_structure( ) { | |
| [...] | |
| if( sps_temporal_mvp_enabled_flag ) { | |
| ph_temporal_mvp_enabled_flag | u(1) |
| if( ph_temporal_mvp_enabled_flag && pps_rpl_info_in_ph_flag ) { | |
| if( num_ref_entries[ 0 ][ RplsIdx[ 0 ] ] > 0 && | |
| num_ref_entries[ 1 ][ RplsIdx[ 1 ] ] > 0 ) | |
| ph_collocated_from_l0_flag | u(1) |
| if( ( ph_collocated_from_l0_flag && | |
| num_ref_entries[ 0 ][ RplsIdx[ 0 ] ] > 1 ) \|\| | |
| ( !ph_collocated_from_l0_flag && | |
| num_ref_entries[ 1 ][ RplsIdx[ 1 ] ] > 1 ) ) | |
| ph_collocated_ref_idx | ue(v) |
| } | |
| } | |
| [...] | |
| } | |

56*. For example, encoder 10 may signal the selected TMVP reference picture 59* in the video bitstream 14, e.g., by signaling an index of the TMVP reference picture 59* in the TMVP picture list 56*. In other words, encoder 10 may signal a picture selector 61 in the video bitstream 14. For example, the picture selector 61 may correspond to the ph_collocated_ref_idx syntax element mentioned below. Decoder 50 may read the picture selector 61 from the video bitstream 14 and select the TMVP reference picture 59* out of the picture list 56* accordingly.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1. When ph_temporal_mvp_enabled_flag and pps_rpl_info_in_ph_flag are both equal to 1 and num_ref_entries [1] [RplsIdx[1]] is equal to 0, the value of ph_collocated_from_l0_flag is inferred to be equal to 1.

ph_collocated_ref_idx specifies the reference index of the collocated picture used for temporal motion vector prediction.

When ph_collocated_from_l0_flag is equal to 1, ph_collocated_ref_idx refers to an entry in reference picture list 0, and the value of ph_collocated_ref_idx shall be in the range of 0 to num_ref_entries[0] [RplsIdx[0]]−1, inclusive.

When ph_collocated_from_l0_flag is equal to 0, ph_collocated_ref_idx refers to an entry in reference picture list 1, and the value of ph_collocated_ref_idx shall be in the range of 0 to num_ref_entries[1] [RplsIdx[1]]−1, inclusive.

When not present, the value of ph_collocated_ref_idx is inferred to be equal to 0.

There is a particular case where the decoder needs to account for and this is when the reference picture lists are empty, i.e. when L0 and L1 both have zero entries. Currently the specification does not signal ph_collocated_from_l0_flag when any of L0 or L1 lists are empty and infers the value of ph_collocated_from_l0_flag to be equal to 1, assuming that the collocated picture is in L0. However, this incurs an efficiency problem. In fact, there are the following possible scenarios regarding the state of L0 and L1:

L0 is empty and L1 is empty: ph_collocated_from_l0_flag inferred to 1=>OK

L0 is not empty and L1 is empty: ph_collocated_from_l0_flag inferred to 1=>OK

Neither of L0 or L1 is empty: ph_collocated_from_l0_flag signalled=>OK.

L0 is empty and L1 is not empty: ph_collocated_from_l0_flag inferred to 1=>NOT OK In the case that L0 is empty but L1 is not empty inferring a value of ph_collocated_from_l0_flag equal to 1 leads to loss in efficiency as this means that TMVP is not used although TMVP (or subblock TMVP) could be still used if a picture of L1 was chosen.

Therefore, in one embodiment the decoder (or encoder) determines the value of ph_collocated_from_l0_flag depending on which list is empty, as, for example, described above with respect to the TMVP list selection module 57 of FIG. 3.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

When ph_temporal_mvp_enabled_flag and pps_rpl_info_in_ph_flag are both equal to 1, the following applies:

When num_ref_entries[1] [RplsIdx[1]] is equal to 0, the value of ph_collocated_from_l0_flag is inferred to be equal to 1.

Otherwise, the value of ph_collocated_from_l0_flag is inferred to be equal to 0.

An alternative to determining the TMVP picture list in dependence on which one of the lists is empty, in another embodiment, there is a bitstream constraint that if L0 is empty, L1 needs to be empty. This can be a bitstream constraint or by syntax prohibited (cf. table 2).

Thus, according to an alternative embodiment of the TMVP module 53 of FIG. 3, encoder 10 selects the TMVP reference picture 59* out of the first list $56_1$ if the second list $56_2$ is empty, and selects the TMVP reference picture 59* out of the first list $56_1$ or the second list $56_2$ if the second list $56_2$ is not empty. In other words, TMVP list selection module 57 as described above, may select the TMVP picture list 56* to be the first list 56*1, if the second list $56_2$ is empty, and may select either the first list or the second list if the second list $56_2$ is not empty.

Accordingly, decoder 50 may, in determining 55 the lists of reference pictures, infer that the second list $56_2$ is empty if the first list $56_1$ is empty. Accordingly, in the TMVP list selection 57, decoder 50 may read the list selector 58 from the video bitstream 14 and select the TVMP reference picture 59* according to the list selector 58, if neither the first list $56_1$ nor the second list $56_2$ is empty. If the first list $56_1$ and the second list $56_2$ are not non-empty, decoder 50 may select the first list $56_1$ as the TMVP picture list 56*, otherwise, decoder 50 may select the first list $56_1$ as the TMVP picture list 56*.

According to embodiments, decoder 50 may perform the list determination 55 by reading, from the video bitstream 14, for the first list of reference pictures, information on how to populate the first list $56_1$ out of the plurality of previously decoder pictures. In cases, in which decoder 50 does not infer that the second list $56_2$ is empty, decoder 50 may read, from the video bitstream 14, information on how to populate the second list $56_2$.

According to the latter embodiments, according to which decoder infers that the second list $56_2$ is empty, if the first list $56_1$ is empty, encoder 10 and decoder 50 may encode the predetermined picture 26* without using TMVP if the first list of reference pictures is empty.

As mentioned above, the bitstream constraint may alternatively be implemented in the form of syntax, e.g., in the construction of the lists of reference pictures. An example implementation is give in Table 2.

TABLE 2

| | Descriptor |
|---|---|
| ref_pic_lists( ) { | |
|   for( i = 0; i < 2; i++ ) { | |
|     if( sps_num_ref_pic_lists[ i ] > 0 && | |
|       ( i == 0 \|\| ( i == 1 && pps_rpl1_idx_present_flag ) ) ) | |
|       rpl_sps_flag[ i ] | u(1) |
|     if( rpl_sps_flag[ i ] ) { | |
|       if( sps_num_ref_pic_lists[ i ] > 1 && | |
|         ( i == 0 \|\| (i == 1 && pps_rpl1_idx_present_flag ) ) ) | |
|         rpl_idx[ i ] | u(v) |
|     } else if ( i == 0 \|\| ( i == 1 && num_ref_entries[ 0 ][ RplsIdx[ 0 ] ] > 0 )) | |
|       ref_pic_list_struct( i, sps_num_ref_pic_lists[ i ] ) | |
|     for( j = 0; j < NumLtrpEntries[ i ][ RplsIdx[ i ] ]; j++ ) { | |
|       if( ltrp_in_header_flag[ i ][ RplsIdx[ i ] ] ) | |
|         poc_lsb_lt[ i ][ j ] | u(v) |
|       delta_poc_msb_cycle_present_flag[ i ][ j ] | u(1) |

TABLE 2-continued

| | Descriptor |
|---|---|
| if( delta_poc_msb_cycle_present_flag[ i ][ j ] ) | |
|     delta_poc_msb_cycle_lt[ i ] [ j ] | ue(v) |
|   } | |
|  } | |
| } | |

Thus when ph_collocated_from_l0_flag is inferred to 1 there is either both lists empty or only list L1 is empty making sure that when there is a single list not empty that one is used for TMVP.

Thus, according to a yet alternative embodiment of the TMVP module 53 of FIG. 3, encoder 10 may perform the TMVP list selection 57 by selecting the TMVP reference picture 56* out of the first list $56_1$ if the second list $57_2$ is empty and select the TMVP reference picture 56* out of the first list $56_1$ of the second list $56_2$ if the second list $56_2$ is not empty.

In the following, embodiments according to the second aspect are described making reference to FIGS. 1-3 and the following FIG. 4.

FIG. 4 illustrates an example of a subdivision of a first picture $26_1$*, e.g., the currently coded picture, into tree root blocks $72_1$, the tree-root blocks $72_1$ being recursively subdivided into blocks 74 and subblocks 76, for example, as described with respect to FIG. 2. FIG. 4 further illustrates a second picture $26_0$', e.g., the picture $26_0$' of FIG. 1, which may be an interlayer reference picture of the first picture $26_1$'. The second picture $26_0$' is subdivided into tree root blocks $72_0$. A first example for the subdivision into tree-root blocks $72_0$ is illustrated by means of the dashed lines. The dotted lines further illustrate an alternative, second example for the subdivision of the second picture $26_0$' into tree root block $72_0$', the tree root blocks $72_0$' of the second example being smaller than the tree root blocks $72_0$ of the first example. According to the first example of the subdivision, tree root blocks $72_0$ have the same size as the tree root blocks $72_1$ of the first picture $26_1$*. In the second example of the subdivision, tree root block $72_0$' are smaller than the tree root blocks $72_1$ of the first picture $26_1$*.

For TMVP for the first picture $26_1$*, encoder 10 and decoder 50 may determine one or more MV candidates. To this end, one or more MV candidates from each of one or more reference pictures of the picture $26_1$* may be determined. For example, encoder 10 and decoder 50 may determine the one or more MV candidates from one or more of the reference pictures out of one or more, e.g., two, lists of reference pictures, e.g., the list $56_1$ and the list $56_2$ as described with respect to FIG. 3. Beyond the reference pictures for the first picture $26_1$*, there may be an interlayer reference picture, such as the second picture $26_0$', which is temporally collated to the first picture, i.e., belonging to the same access unit 22, as illustrated in FIG. 1. As described with respect to FIG. 2, pictures 26 may be coded block-wise or subblock-wise, and encoder 10 may determine one MV for a currently coded block 74* of a currently coded tree root block $72_1$* of the currently coded picture $26_1$*, or may alternatively determine one MV for each of subblocks 76 of the currently coded block 74*. The currently coded subblock may be referenced using reference sign 76*. Encoder 10, and optionally also decoder 50, may determine, for the currently coded block 74* or the currently coded subblock 76*, one or more MV candidates out of one reference picture, e.g., the second picture $26_0$'. The one or more MV candidates may be determined from different positions or locations within the reference picture. For example, for a bottom right MV candidate for the currently coded block 74* or the currently coded subblock 76*, a MV of the reference picture located at a reference position 71' in the reference picture may be selected as the MV candidate, the reference position 71' for the bottom right MV candidate being collocated to a bottom right position 71 in the currently coded picture $26_1$'. For example, the bottom right position 71 for the currently coded block 74* or the currently coded subblock 76* may be a position which neighbors block 74* or subblock 76* in bottom and right direction.

In FIG. 4, for the first example of the subdivision of the second picture $26_0$' into tree root blocks $72_0$, the collocated block of the currently coded block 74* of the first picture $26_1$' is indicated using reference signs $71_4$*. As illustrated in FIG. 4, for this first example of the subdivision, in which the size of tree root blocks $72_0$ equals the size of tree root blocks $72_1$ of the first picture $26_1$*, the reference position 71' is located within a bottom right block $71_4$' of block $71_4$*, and the block $71_4$' is located within the same tree root block $72_0$* as the collocated block $71_4$* of the currently coded block 74* of the first picture $26_1$*. For example, one MV candidate for the coding of block 74* of the first picture $26_1$* may be the MV of block $71_4$'.

For the second example of the subdivision of the reference picture $26_0$' into tree root block $72_0$', the smaller than the tree root blocks $72_1$ of the first picture $26_1$*, the reference position 71' may be located outside the collocated tree root block $72_0$'. In particular, the reference position 71' may be located outside a row of tree root blocks in which the collocated tree root block $72_0$' of the currently coded block 74* is located. Using the MV from the tree root block in which reference position 71' is located as a MV candidate for the currently coded block 74* or the currently coded subblock 76* may therefore require the encoder 10 and the decoder 50 to keep one or more tree root blocks beyond the currently coded tree root block or beyond the current row of the currently coded tree root block of the second picture $26_0$' in the picture buffer. Thus, in this second example of tree root block subdivisioning, using reference position 71 for MV prediction may involve an inefficient buffer usage.

In other words, as described with respect to FIG. 3, the current specification uses two syntax elements to control the picture used for TMVP (or subblock TMVP), namely ph_collocated_from_l0_flag and ph_collocated_ref_idx, wherein the latter specifies which entry of the respective list is used as reference picture, e.g. as described with respect to FIG. 3. When TMVP (e.g. TMVP for a MV for one of blocks 74 of FIG. 2) or subblock TMVP (e.g. TMVP for a MV for one of subblocks 76 of FIG. 2) is used in a bitstream, a motion vector (MV) for a block or subblock in the current picture 26* is derived from MVs of a reference picture indicated by ph_collocated_ref_idx and that MV is added to a candidate list from which it can be chosen as a predictor for the real used motion vector for a block/subblock. This MV prediction selects among MVs of different positions depending on the largest block (CTU) (e.g. tree-root block 72 of FIG. 2) boundaries of the current picture 26*. In most scenarios, the reference picture exhibits the same CTU boundaries.

In more details, for TMVP, when a bottom-right TMVP MV candidate 71 (e.g. for a currently coded block 74* or subblock 76) is located beyond the CTU row boundary of the current block (i.e. beyond the row boundary of the tree-root block 72 to which block 74 or subblock 76 belongs, e.g. for the tree-root block 74* in FIG. 4) or does not exist (e.g. because it exceeds beyond the picture boundary or it is intra coded without using a motion-vector), the TMVP candidate is not taken from the right-bottom block and instead an alternative (collocated) MV candidate in the CTU row is derived, i.e. from the collocated block (of the block 74 or subblock 76 for which the MV candidate is to be determined). Further, when a subblock TMVP MV candidate is to be taken from a position outside the collocated CTU, the MV used for determining the position of the subblock TMVP MV is modified (clipped) in the derivation to point to the position where the subblock TMVP MV candidate is taken from a position that belongs to the collocated CTU. Note that for subblock TMVP, first a MV is taken (e.g., first from spatial candidates), that MV is used to locate in the collocated picture, the block that is used to select the subblock TMVP candidate. If that temporal MV used to locate the position was pointing to a position outside the collocated CTU, the MV would be clipped so that the subblock TMVP is taken from a position within the collocated CTU.

There exist however, cases, where the reference picture might not have the same CTU sizes, e.g. tree root blocks 72₁' in FIG. 4, and therefore boundaries. The discussed TMVP or subblock TMVP process is not clear for such cases as the CTU sizes changes. If applied as such, as in the state-of-the-art, buffer-unfriendly TMVP and subblock TMVP candidates are chosen that lie outside the current CTU (row) or the CTU (row) of the reference pictures, e.g. position 71'. Implementations are relieved of this burden through this aspect of the invention which targets to either guide MV candidate selection accordingly or prevent such cases from happening. The described scenario occurs in quality scalable multi-layer bitstream with two (or more) layers, wherein one layers is depending on the other layer as illustrated in the left-hand side of FIG. 5, wherein the dependent layer has a larger CTU size than the reference layer. In such a case, a decoder needs to fetch MV candidates associated from 4 smaller CTUs of the reference picture which do not necessarily occupy consecutive memory areas which incurs a negative impact on memory bandwidth when accessing. On the other hand, on the right-hand side of FIG. 5, the CTU sizes of the reference picture are larger than in the dependent layer. In such a case, no data is interspersed between relevant data of the reference layer when decoding a current block of the dependent layer.

As discussed, when the two layers have different CTU sizes (parameter of the respective SPS), the CTU boundaries of current and reference picture (ILRP in this scenario) are not aligned but TMVP and subblock TMVP are not prohibited from being activated and used by the encoder.

According to an embodiment of the second aspect, encoder 10, e.g. the one of FIG. 1, is for layered video coding, e.g. as described with respect to FIG. 1, and for encoding pictures 26 of a video 20 into the multi-layered data stream 14 (or multi-layered video bitstream 14) in units of blocks 74 into which the pictures 26 are subdivided by pre-dividing each picture into one or more tree root blocks

72 and subjecting each tree root block 72 of the respective picture 26 to recursive block partitioning, e.g., as described with respect to FIGS. 2 and 4. Each picture 26 is associated to one of layers 24, e.g., as described with respect to FIG. 1. The size of the tree root blocks 72 may be equal for all pictures which belong to the same layer 24. Encoder 10 according to embodiments of the second aspect populates for a first picture 26₁* of a first layer 24₁ (cf. FIG. 1), a list of reference pictures out of a plurality of previously coded pictures, e.g., list 56₁ or list 56₂, e.g. as described with respect to FIG. 3. As described with respect to FIG. 4, the list of reference pictures may include pictures of equal layer and different time stamps, e.g., the picture 26₁' of FIG. 1, which pictures are encoded into the multi-layered data stream 14 upstream relative to the first picture 26₁*. Additionally, the list of reference pictures may include one or more second pictures, the second pictures belonging to a different layer, e.g., the second layer 24₀, and being temporally aligned to the first picture 26₁*, e.g., the second picture 26₀'. The encoder may signal the size of the tree root blocks of the first layer 24₁, to which the first picture 26₁* belongs, and the size of the different layer, e.g., the second layer 24₀, to which the second pictures belong in the multi-layered video bitstream 14. Encoder 10 and decoder 50 may use the list of reference pictures so as to inter-predict, using motion compensation prediction, inter predicted blocks of the first picture 26₁*, and predict motion vectors for inter-predicted blocks.

According to a first embodiment of the second aspect, the size of the tree root blocks of the second picture 26₀' is equal, or equal to an integer multiple of, the size of the tree root blocks of the first picture 26₀*. For example, the video encoder may populate the list 56 of reference pictures, or the two lists 56₁, 56₂ of reference pictures described with respect to FIG. 3, so that for each of the reference pictures of the list of reference pictures, the size of the tree root blocks is equal to, or equal to an integer multiple of, the size of the tree root blocks of the first picture 26₁*.

In other words, in examples of the first embodiment, the use of TMVP and subblock TMVP is deactivated by imposing a constraint on ILRP in the reference picture lists of the current pictures as follows:

The following constraints apply for the picture referred to by each ILRP entry, when present, in RefPicList[0] or RefPicList[1] of a slice of the current picture:

The picture shall be in the same AU as the current picture.

The picture shall be present in the DPB.

The picture shall have nuh_layer_id refPicLayerId less than the nuh_layer_id of the current picture.

The picture shall have the same value of or a larger value of sps_log2_ctu_size_minus5 than the current picture.

Either of the following constraints applies:

The picture shall be an IRAP picture.

The picture shall have TemporalId less than or equal to Max(0, vps_max_tid_il_ref_pics_plus1[currLayerIdx][refLayerIdx]−1), where currLayerIdx and refLayerIdx are equal to GeneralLayerIdx[nuh_layer_id] and GeneralLayerIdx[refpicLayerId], respectively.

The worst case of the problem described above happens when the referenced picture has smaller CTU sizes as this would lead to higher memory bandwidth requirements for TMVP and subblock TMVP. If the CTUs of the reference picture are smaller then, getting the TMVP or subblock TMVP candidates would not be as critical and therefore, the previously described embodiments are only applied when the CTU sizes are smaller in the referenced picture. Therefore, it is not a problem when the CTU size of the referenced picture is larger than in the current picture, as in the previous embodiment.

Nevertheless, according to examples of the first embodiment of the second aspect, the constraint is such that for each inter-layer reference picture, i.e. each of the second pictures, (and, e.g., consequently for all reference pictures, as pictures of the same layer may have the same size of tree root blocks) in the list of reference picture the size of its tree-root blocks is required to be equal to, or equal to or an integer multiple of, the size of the tree-root blocks of the first picture $26_1^*$.

Thus, in examples of the first embodiment, the use of TMVP and subblock TMVP is deactivated by imposing a constraint on ILRP in the reference picture lists of the current pictures as follows:

The following constraints apply for the picture referred to by each ILRP entry, when present, in RefPicList[0] or RefPicList[1] of a slice of the current picture:

The picture shall be in the same AU as the current picture.

The picture shall be present in the DPB.

The picture shall have nuh_layer_id refPicLayerId less than the nuh_layer_id of the current picture.

The picture shall have the same value of sps_log2_ctu_size_minus5 than the current picture (i.e. the picture shall have the same tree root block size as the currently coded picture $26_1^*$).

Either of the following constraints applies:

The picture shall be an IRAP picture.

The picture shall have TemporalId less than or equal to Max(0, vps_max_tid_il_ref_pics_plus1[currLayerIdx] [refLayerIdx]−1), where currLayerIdx and refLayerIdx are equal to GeneralLayerIdx [nuh_layer_id] and GeneralLayerIdx[refpicLayerId], respectively.

However, this embodiment is very restrictive constraint that prevents any form of prediction, e.g. sample prediction, which is oblivious to different CTU sizes in dependent and reference layer.

Accordingly, according to a second embodiment of the second aspect, the list of reference pictures may include pictures of the type of the second pictures, i.e., pictures of a different layer such as the second layer $24_0$, which do not necessarily have a smaller or an equal size of their tree root blocks $72_0$, but the list of reference pictures may rather include any of the second pictures (the ones of the second layer $24_0$). According to this embodiment, an encoder 10 appoints, for the first picture $26_1^*$, one picture out of the list of reference pictures as a TVMP reference picture, for example, as described with respect to FIG. 3. Encoder 10, according to this embodiment, appoints the TVMP reference picture so that the TVMP reference picture is not a second picture $26_0$, the size of the tree root blocks $72_0$ of which is smaller than the size of the tree root blocks $72_1$ of the first picture $26_1^*$. In other words, if encoder 10 selects one of the second pictures $26_0$ as the TVMP reference picture, that is, if the encoder 10 selects a picture from a different layer such as layer $24_0$ as the TVMP reference picture for the first picture $26_1^*$, the TVMP reference picture has an equal or larger size of its tree root blocks than the first picture $26_1^*$. Encoder 10 may signal a pointer identifying the TVMP reference picture out of the pictures of the list of reference pictures in the multi-layered video data stream 14. Encoder 10 uses the TVMP reference picture for predicting motion vectors of inter-predicted blocks of the first picture $26_1^*$.

Restricting the appointment of the TMVP reference picture from the list of reference pictures instead of restricting the population of the list allows for usage of second pictures $26_0$ having smaller tree-root block size than the first picture for other prediction tools.

For example, the list of reference pictures may be one of the first list $56_1$ and the second list $56_2$ as described with respect to FIG. 3, however, the way of selecting the TMVP reference list does not necessarily follow the manner described with respect to FIG. 3, but may be performed otherwise, e.g. as described for the state of the art.

For example, the encoder 10 may select a TVMP reference picture so that, if the TVMP reference picture is a second picture, i.e., a picture of a different layer than the currently coded picture, none of the criteria of the following set of criteria is fulfilled:

the size of the tree root blocks $72_0$ of the second picture $26_0$ is smaller than the size of the tree root blocks $72_1$ of the first picture $26_1^*$.

a size of the TVMP reference picture differs from the size of the first picture $26_1^*$, a scaling window of the TVMP picture, the scaling window being used for motion vector scaling and offsetting, differs from a scaling window of the first picture $26_1^*$.

a subpicture subdivision of the TVMP reference picture $26_0'$ differs from a picture subdivision of the first picture $26_1^*$.

Encoder 10 may, in inter-predicting the inter-predicted blocks of the first picture $26_1^*$, activate, for each inter-predicted block, a set of one or more inter-prediction refinement tools independence on a reference picture of the list of reference pictures in which the respective inter-predicted block is inter-predicted from, fulfilling any of the set of the above criteria. For example, the set of inter-prediction refinement tools may include one or more of TVMP, PROF, wraparound, VDOF and DVMR.

In other words, according to examples of the second embodiment, the problem is solved by imposing a constrain on the syntax element sh_collocated_ref_idx that indicates the reference pictures used for TVMP and subblock TVMP.

sh_collocated_ref_idx specifies the reference index of the collocated picture used for temporal motion vector prediction.

When sh_slice_type is equal to P or when sh_slice_type is equal to B and sh_collocated_from_l0_flag is equal to 1, sh_collocated_ref_idx refers to an entry in reference picture list 0, and the value of sh_collocated_ref_idx shall be in the range of 0 to NumRefIdxActive [0]−1, inclusive.

When sh_slice_type is equal to B and sh_collocated_from_l0_flag is equal to 0, sh_collocated_ref_idx refers to an entry in reference picture list 1, and the value of sh_collocated_ref_idx shall be in the range of 0 to NumRefIdxActive[1]−1, inclusive.

When sh_collocated_ref_idx is not present, the following applies:

If pps_rpl_info_in_ph_flag is equal to 1, the value of sh_collocated_ref_idx is inferred to be equal to ph_collocated_ref_idx.

Otherwise (pps_rpl_info_in_ph_flag is equal to 0), the value of sh_collocated_ref_idx is inferred to be equal to 0.

Let colPicList be set equal to sh_collocated_from_l0_flag?0:1. It is a requirement of bitstream conformance that the picture referred to by sh_collocated_ref_idx shall be the same for all non-I slices of a coded picture and the value of RprConstraintsActiveFlag [colPicList][sh_collocated_ref_idx] shall be equal to 0 and the value of sps_log2_ctu_size_minus5 for the picture referred to by sh_collocated_ref_idx shall be equal to or larger than the value of sps_log2_ctu_ size_minus5 of the current picture.

NOTE—The above constraint requires the collocated picture to have the same spatial resolution. the same scaling window offsets and same or smaller CTU size as the current picture.

Again, the previous example may prevent the case in which the selected inter-layer reference picture has a smaller tree-root block size than the first picture. In other examples, encoder 10 may appoint the TVMP reference picture for the first picture $26_1*$ so that the reference picture has a tree root block size which equals the size of the tree root blocks $72_1$ of the picture $26_1*$ for which the TVMP reference picture is selected.

Accordingly, another exemplarily implementation reads as follows:

sh_collocated_ref_idx specifies the reference index of the collocated picture used for temporal motion vector prediction.

When sh_slice_type is equal to P or when sh_slice_type is equal to B and sh_collocated_from_l0_flag is equal to 1, sh_collocated_ref_idx refers to an entry in reference picture list 0, and the value of sh_collocated_ref_idx shall be in the range of 0 to NumRefIdxActive[0]−1, inclusive.

When sh_slice_type is equal to B and sh_collocated_from_l0_flag is equal to 0. sh_collocated_ref_idx refers to an entry in reference picture list 1, and the value of sh_collocated_ref_idx shall be in the range of 0 to NumRefIdxActive[1]−1, inclusive.

When sh_collocated_ref_idx is not present, the following applies:

If pps_rpl_info_in_ph_flag is equal to 1, the value of sh_collocated_ref_idx is inferred to be equal to ph_collocated_ref_idx.

Otherwise (pps_rpl_info_in_ph_flag is equal to 0), the value of sh_collocated_ref_idx is inferred to be equal to 0.

Let colPicList be set equal to sh_collocated_from_l0_flag?0:1. It is a requirement of bitstream conformance that the picture referred to by sh_collocated_ref_idx shall be the same for all non-I slices of a coded picture and the value of RprConstraintsActiveFlag [colPicList][sh_collocated_ref_idx] shall be equal to 0 and the value of sps_log2_ctu_size_minus5 for the picture referred to by sh_collocated_ref_idx shall be equal to the value of sps_log2_ctu_size_minus5 of the current picture.

NOTE—The above constraint requires the collocated picture to have the same spatial resolution. the same scaling window offsets and same CTU size as the current picture.

According to third embodiments of the second aspect, encoder 10 and decoder 50 may employ the above-described set of one or more inter-prediction refinement tools in inter-predicting inter-predicted blocks of the predetermined picture $26_1*$ in dependence on the reference picture used for inter-predicting the respective inter-predicted block fulfilling any of the above-mentioned set of the criteria, wherein this constraint for using the inter-prediction refinement tools is not necessarily limited to the multi-layer case, in which the reference picture is an inter-layer reference picture for picture 26* to be coded.

In examples, the encoder 10 and decoder 50 may derive the list of reference pictures from which the reference picture is selected, as described with respect to FIG. 3 but also different approaches for signaling or selecting the reference picture may be possible.

In other words, according to embodiments, an encoder 10 and a decoder 50 which code pictures (i.e., encode in case of encoder 10 and decode in case of decoder 50) in units of blocks which result from a recursive block partitioning of tree root blocks as described before, may use, in inter-predicting inter-predicted blocks of the currently coded picture 26*, the set of one or more inter-prediction refinement tools in dependence on whether any of a set of the following criteria are fulfilled:

the size of the tree root blocks of the currently coded picture 26* is smaller than the size of the tree root blocks of the reference picture, the size of the reference picture equals the size of the currently coded picture 26*, the scaling window of the reference picture, which scaling window is used for motion vector scaling and offsetting, equals the scaling window of the predetermined picture, for example, differs in terms of an offset of the scaling window, and the subpicture subdivision of the reference picture equals the subpicture subdivision of the predetermined picture, that is, for example, the subpicture subdivision differs in terms of a number of subpictures of the subpicture subdivision.

In examples, the set of criteria may include that the size of the tree root blocks of the reference picture equals the size of the tree root blocks of the predetermined picture 26*.

In examples, in inter-predicting an inter-predicted block, encoder 10 and decoder 50 may selectively activate the set of inter-prediction refinement tools, if all of a subset of the set of criteria are fulfilled. In other examples, encoder 10 and decoder 50 may activate the inter-prediction refinement tools if all of the set of criteria are fulfilled.

For example, according to the third embodiments, the constraint is expressed via the derived variable RprConstraintsActiveFlag[refPicutre][currentPic] which is derived by comparing characteristics of the current picture and the reference picture such as picture size, scaling window offset and number of subpictures and so on. This variable is used to impose a constraint on the indicated ph_collocated_ref_idx in pictures headers of sh_collocated_ref_idx in slice headers. In this embodiment, the size of CTUs in the reference picture and current picture (sps_log2_ctu_size_minus5) is incorporated into the respective derivation of RprConstraintsActiveFlag[refPicutre][currentPic], such that when the CTU sizes of the reference picture are larger that those of the current picture RprConstraintsActiveFlag[refPicutre][currentPic] is derived as 1.

Similarly, but for the case in which the criteria include that a size of the tree root blocks of the reference picture equals the size of the tree root blocks of the predetermined picture 26*, the constraint be expressed via the may derived variable RprConstraintsActiveFlag[refPicutre][currentPic] which is derived by comparing characteristics of the current picture and the reference picture such as picture size, scaling window offset and number of subpictures and so on. This variable is used to impose a constraint on the indicated ph_collocated_ref_idx in pictures headers of sh_collocated_ref_idx in slice headers. In this embodiment, the size of CTUs in the reference picture and current picture (sps_log2_ctu_size_minus5) is incorporated into the respective derivation of RprConstraintsActiveFlag[refPicutre]

[currentPic], such that when the CTU sizes are different, RprConstraintsActiveFlag[refPicutre][currentPic] is derived as 1.

In such a case, the embodiment would also disallow tools such a PROF, wraparound, BDOF and DMVR, as it might be undesirable to allow different CTU sizes when such tools are used.

Although the description before focuses only on TMVP and subblock TMVP, further issues are identified that apply when different CTUs are used in different layers. For instance, even though TMVP and subblock TMVP was allowed for picture having different CTU sizes with their associated "drawback" to it, there are issues when combined with subpictures. In fact, when subpictures are used and they are used together with layer coding, there are a set of constraints that are required so that the subpicture grids are aligned. This is done for layer with subpictures within a dependency tree.

FIG. 6 illustrates an example of a subpicture subdivision of a picture $26_1$ into two subpictures $28_1'$, $28_1''$. Picture $26_1$ may belong to a first layer, e.g., layer $24_1$, and may belong to an access unit 22 as described with respect to FIG. 1. In other words, picture $26_1$ of FIG. 6 may be one of pictures $26_1$ of FIG. 1. Picture $26_1$ may depend on a reference picture $26_0$, e.g., the second layer $24_0$ of FIG. 1. In other words, picture $26_0$ may be an inter-layer reference picture of picture $26_1$, and the layer to which picture $26_0$ belongs, may be referred to as a reference layer of the layer to which picture $26_1$ belongs. For example, all pictures which belong to the same coded video sequence 20 and which belong to the same layer may be subject to the same subpicture subdivision, that is, may be subdivided into the same number of subpictures having equal sizes. It is also noted that all pictures of the coded video sequence 20, belonging to the same of the layers 24 may be partitioned into tree root blocks of equal size. Encoder 10 may be configured for subdividing the pictures $26_1$ of the first layer $24_1$ and the pictures $26_0$ which belong to a reference layer of the first layer $26_1$, namely the second layer $24_0$, into a common number of two or more subpictures 28. Such a subdivision into a common number of two or more subpictures is illustrated in FIG. 6, in which the picture $26_0$ of the reference layer $24_0$ is subdivisioned into two subpictures $28_0'$, $28_0''$. Encoder 10 may encode the subpictures 28', 28'', i.e., the subpictures belonging to a common layer, e.g., layer $24_1$ or layer $24_0$, independently from each other. That is, encoder may encode independently coded subpictures without spatial prediction of parts of one of the subpictures 28' by another one 28'' of the subpictures. For example, encoder 10 may apply sample padding in the boundary between pictures 28' and 28'' so that the coding of the two subpictures is independent from each other. Also, encoder 10 may clip motion vectors at the boundary between subpictures 28' and 28''. Optionally, encoder 10 may signal in the video data stream 14, that the subpictures of a layer are coded independently, e.g., by signaling an sps_subpic_treated_as_pic_flag=1. Encoder 10 may code the subpictures 28 into the video bitstream 14 in units of blocks 74, 76, which, e.g., result from a partitioning of one or more tree root blocks 72, into which subpictures 28 are partitioned, as described with respect to FIGS. 2 and 4 with respect to pictures 26. Encoder 10 may partition the subpictures $28_1$, $28_0$ of the first layer $24_1$ and the reference layer $24_0$ of the first layer $24_1$ the pictures 26 of which are subdivided into a common number of subpictures, into equal size tree root blocks. In other words, for the case that pictures $26_1$ of the first layer $24_1$ and reference pictures $26_0$ of the reference layer $24_0$ are subdivided into a common number of two or more subpictures, encoder 10 may subdivide the subpictures $28_1$, $28_0$ so that the tree root blocks of the subpictures $28_1$ of the first layer $24_1$ and the subpictures $28_0$ of the reference layer $24_0$ have the same size.

In other words, in another alternative embodiment, the issue is solved only for the case of independent subpictures by extending the subpicture related constraints as follows:

sps_subpic_treated_as_pic_flag[i] equal to 1 specifies that the i-th subpicture of each coded picture in the CLVS is treated as a picture in the decoding process excluding in-loop filtering operations. sps_subpic_treated_as_pic_flag[i] equal to 0 specifies that the i-th subpicture of each coded picture in the CLVS is not treated as a picture in the decoding process excluding in-loop filtering operations. When not present, the value of sps_subpic_treated_as_pic_flag[i] is inferred to be equal to 1.

When sps_num_subpics_minus1 is greater than 0 and sps_subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:

For each AU in targetAuSet, all pictures of the layers in targetLayerSet shall have the same value of pps_pic_width_in_luma_samples and the same value of pps_pic_height_in_luma_samples.

All the SPSs referred to by the layers in targetLayerSet shall have the same value of sps_num_subpics_minus1 and shall have the same values of sps_subpic_ctu_top_left_x[j], sps_subpic_ctu_top_left_y[j], sps_subpic_width_minus1[j], sps_subpic_height_minus1[j], and sps_subpic_treated_as_pic_flag[j], respectively, for each value of j in the range of 0 to sps_num_subpics_minus1, inclusive and sps_log2_ctu_size_minus5, For each AU in targetAuSet, all pictures of the layers in targetLayerSet shall have the same value of SubpicIdVal[j] for each value of j in the range of 0 to sps_num_subpics_minus1, inclusive.

According to embodiments, encoder 10 and decoder 50 may inter-predict a block, for example, the currently coded block 74* or the currently coded subblock 76* of a currently coded picture 26* of the first layer $24_1$ by using a coding parameter, such as a motion vector, of a corresponding block of the picture of the reference layer $24_0$, e.g., block $71_4$* may be the corresponding block for block 74* of FIG. 4. In other words, the corresponding block is collocated, e.g., corresponding in position within the respective picture, i.e., within the respective reference picture, to the currently coded block, or may be referred to by a motion vector of the currently coded block. Encoder 10 and decoder 50 may use the coding parameter of the corresponding block for predicting a coding parameter, such as a motion vector, of the currently coded block.

By subdividing subpictures of the reference layer $24_0$ into tree root blocks having the same size as the tree root blocks of the first layer, which depends on the reference layer, may ensure that the subpictures 28 are coded independently from each other. In this respect, similar considerations as described with respect to FIG. 4 for the boundaries of tree root blocks apply. In other words, the considerations with respect to FIG. 4, explaining the benefit of equally sized tree root blocks for the subdivision of pictures 26 may also apply for the subdivision of subpictures 28.

FIG. 7 illustrates an example of a decoder 50 and the video bitstream 14 according to embodiments of the third aspect of the invention. Decoder 50 and video bitstream 14 may optionally correspond to decoder 50 and video bitstream 14 of FIG. 1. According to embodiments of the third aspect, video bitstream 14 is a multi-layered video bitstream comprising access units 22, each access unit 22 comprising one or more pictures 26 of a coded video sequence 20 coded into the video bitstream 14. For example, the description of layers 24 and access units 22 of FIG. 1 may apply. Thus, each of the pictures 26 belongs to one of layers 24, the association between pictures and layers being indicated by the subscript index, i.e., pictures $26_1$ belonging to a first layer $24_1$ and pictures $26_0$ belonging to a second layer $24_0$. In FIG. 7, pictures 26 and the access units 22 to which they belong, are illustrated according to their picture order, i.e., their presentation order, of the coded video sequence 20. Each of the access units 22 belong to a temporal sublayer of a set of temporal sublayers. For example, in FIG. 7, access units $22_1$, to which pictures with superscript index 1 belong, belong to a first temporal sublayer and access units $22_2$, to which pictures referenced using reference signs with superscript index 2 belong, belong to a second temporal sublayer. As illustrated in FIG. 7, access units belonging to different temporal sublayers do not necessarily have pictures for the same set of layers 24. For example, in FIG. 7, access units $22_1$ have pictures for the first layer $24_1$ and the second layer $24_0$, while access units $22_2$ may have only pictures for the first layer $24_1$. The temporal sublayers may be ordered hierarchically and may be indexed with an index representing the hierarchical order. In other words, due to the hierarchical order of the temporal sublayers, a highest and a lowest temporal sublayer may be defined within a set of temporal sublayers. It is noted that video bitstream 14 may optionally have further temporal sublayers and/or further layers.

According to embodiments of the third aspect, the video bitstream 14 has encoded thereinto an output layer set indication 81 indicating one or more output layer sets 83. The OLS indication 81 indicates for the OLS 83, a subset of the layers 24 of the multi-layered video bitstream 14 (a not necessarily proper subset, i.e., the OLS may indicate all of the layers 24 of the multi-layered audio bitstream 14 to belong to the OLS) belonging to the OLS. For example, the OLS may be an indication for a (not necessarily proper) sub bitstream extractable or decodable from the video bitstream 14, the sub bitstream including the subset of layers 24. For example, by extracting or decoding a subset of layers of the video bitstream 14, the coded video sequence to be decoded may be scalable in quality, and thus, in bitrate.

According to embodiments of the third aspect, video bitstream 14 further comprises a video parameter set (VPS) 91. The VPS 91 includes one or more bitstream conformance sets 86, e.g., a hypothetical reference decoder (HRD) parameter set. The video parameter set 91 further comprises one or more buffer requirement sets 84, e.g., a decoded picture buffer (DPB) parameter set. The video parameter set 91 further comprises one or more decoder requirement sets 82, e.g., a profile-tier-level parameter set (PTL set). Each of the bitstream conformance sets 86, the buffer requirement sets 84, and the decoder requirement sets 82 are associated with a respective temporal subset indication 96, 94, 92, respectively, which are indicated in the video parameter set 91. The constraint on the maximum temporal sublayer for each of the parameter sets, i.e., the bitstream conformance sets 86, the buffer requirement sets 84 and the decoder requirement sets 82, may represent an upper limit of the number of temporal sublayers to which the parameters of the respective parameter sets refer. In other words, the parameter signaled by a parameter set may be valid for a (not necessarily proper) subsequence of the coded video sequence 20 or a sub bitstream of the video bitstream 14, defined by a set of layers and a set of temporal sublayers, and the constrain on the maximum temporal sublayer for the respective parameter set indicates the maximum temporal sublayer of the sub bitstream or the subsequence to which the representative parameter set refers.

According to a first embodiment of the third aspect, decoder 50 may be configured for receiving a maximum temporal sublayer indication 99. The maximum temporal sublayer indication 99 is indicative of a maximum temporal sublayer of the multi-layered video bitstream 14 to be decoded by decoder 50. In other words, the maximum temporal sublayer indication 99 may signal to decoder 50 which set or subset of temporal layers of the video bitstream 14 decoder 50 shall decode. Thus, decoder 50 may receive the maximum temporal sublayer indication 99 from an external signal. For example, the maximum temporal sublayer indication 99 may be included in the video bitstream 14, or may be provided to decoder 50 via an API. Upon reception of the maximum temporal sublayer indication 99, decoder 50 may decode the video bitstream 14, or a portion thereof, as far as it belongs to the set of temporal sublayers indicated by the maximum temporal sublayer indication 99. For example, decoder 50 may additionally be configured for receiving an indication for an OLS to be decoded. Upon reception of an indication for an OLS to be decoded and reception of the maximum temporal sublayer indication 99, decoder 50 may decode the layers indicated by the OLS to be decoded up to the temporal sublayer indicated by the maximum temporal sublayer indication 99. However, there may be situations or scenarios, in which decoder 50 does not receive one or both of the external indications for the temporal sublayer, i.e., the maximum temporal sublayer indication 99, and the indication for the OLS to be decoded. In such situations, decoder 50 may determine the missing indication, e.g., on the basis of information available in the video bitstream 14.

According to the first embodiment of the third aspect, decoder 50 determines, in the case that the maximum temporal sublayer indication 99 is not available, e.g. not available from the data stream and/or not available via other means, the maximum temporal sublayer to be decoded to be equal to the maximum temporal sublayer as indicated by the constraint 92 on the maximum temporal sublayer of the decoder requirement set 82 which is associated with the OLS 83. In other words, decoder 50 may use the constraint 92 on the maximum temporal sublayer, which constraint 92 is indicated for the decoder requirement set 82 associated with the OLS to be decoded by decoder 50.

Decoder 50 may use the information on the maximum temporal sublayer to be decoded for decoding the multi-layered video bitstream 14 by considering a temporal sublayer of the multi-layered video bitstream for decoding, if the temporal sublayer does not exceed the maximum temporal sublayer to be decoded, and omitting the temporal sublayer in the decoding otherwise.

For example, video bitstream 14 may be indicative of one or more OLS 83, each of which has associated therewith one of the bitstream conformance sets 86, the buffer requirement sets 84 and the decoder requirement sets 82 signaled in the video parameter set 91. Decoder 50 may select on the OLSs

83 for decoding, either on the basis of an external indication (provided, e.g., via an API or the video bitstream 14) or, e.g., an absence of an external indication, on the basis of a selection rule. If the maximum temporal sublayer indication 99 is not available, i.e., decoder 50 does not receive a maximum temporal sublayer indication, decoder 50 uses the constraint 92 on the maximum temporal sublayer of the decoder requirement set 82 associated with the OLS to be decoded.

For example, the constraint 82 for the decoder require- ment set 82 associated with the OLS is, e.g., by bitstream constraint equal to or smaller than the constraints 94, 96 on the maximum temporal sublayer associated with buffer requirement set 84 and the bitstream conforming set 86. Thus, selecting the constraint 92 associated with a decoder capability set for decoding results in selecting the minimum beyond the maximum temporal sublayers indicated for the decoder requirement set 82, the buffer requirement set 84 and the bitstream conformance set 86 associated with the OLS. Selecting the minimum beyond the constraints for the maximum temporal sublayer may ensure that the respective parameter sets 82, 84, 86 include parameters which are valid for the bitstream selected for decoding. Thus, selecting the constraint 92 associated with the decoder requirement set 82 may ensure to select a bitstream for decoding for which parameters for all of the parameter sets 82, 84, 86 are available.

For example, each of the parameter sets out of the bitstream conformance set 86, the buffer requirement set 84 and the decoder requirement set 82 associated with the OLS may include one or more sets of parameters, each of the sets of parameters being associated with a temporal sublayer or with a maximum temporal sublayer. Decoder 50 may select, from each of the parameter sets a set of parameters associ- ated with a maximum temporal sublayer to be decoded, as inferred or as received. For example, a set of parameters may be associated with a maximum temporal sublayer, if the set of parameters is associated with the maximum temporal sublayer or if the set of parameters is associated with a temporal sublayer equal to or lower than the maximum temporal sublayer. Decoder 50 may use the selected set of parameters for adjusting one or more of the coded picture buffer size, a decoded picture buffer size, a buffer schedul- ing, for example, an HRD timing (AU/DU removal times, DPB output times).

As mentioned above, the indication 99 of the maximum temporal sublayer to be decoded may be signaled in the video bitstream 14. According to the first embodiment, encoder 10, e.g. encoder 10 of FIG. 1, may optionally be configured for omitting a signaling of the indication 99 if the maximum temporal sublayer to be decoded corresponds to the constraint 92 associated with the decoder requirement set 82 of the OLS, e.g. an OLS indicated to be decoded, as in this case, decoder 50 may infer the maximum temporal sublayer to be decoded correctly. In other words, in this case, encoder 10 may either signal the indication 99 or not signal the indication 99. In examples, encoder 10 may in this case decide, whether or not to signal the indication 99, or whether or not to omit a signaling of the indication 99.

For example, the VPS 91 may be in accordance with the following example: Currently, there are three syntax struc- tures in the VPS that are defined generally and subsequently mapped to a specific OLS:

Profile-tier-level (PTL), e.g. the decoder requirement set 82,

DPB parameters, e.g. the buffer requirement set 84,

HRD parameters, e.g. the bitstream conformance set 86, and another syntax element vps_max_sublayers_minus1 used when extracting an OLS subbitstream, i.e. deriving the variable NumSublayerInLayer[i][j] in some cases.

FIG. 8 illustrates an example for a PTL 82, DPB 84 and HRD 86 definition and a mapping to an OLS 83. The mapping of PTL to OLSs is done in the VPS for all OLS (with single layer or with multilayer). However, the mapping for the DPB and HRD parameters to OLS is only done in the VPS for OLS with more than one layer. As illustrated in FIG. 8, the parameters for PTL, DPB and HRD are described in the VPS first and then OLSs are mapped to indicate which parameter they use.

In the example shown in FIG. 8 there are 2 OLSs and two of each of these parameters. The definition and mapping has been however specified to allow more than one OLS to share the same parameters and thus not require repeating the same information multiple times, e.g. as illustrated in FIG. 9. FIG. 9 illustrates an example for PTL, DPB and HRD definition and sharing among different OLS, wherein the example of FIG. 9, OLS 2 and OLS 3 have the same PTL and DBP parameters but different HRD parameters.

In the examples given in FIG. 8 and FIG. 9, the values of vps_ptl_max_temporal_id[ptlIdx] (e.g. the constraint 92 on the maximum temporal sublayer for the decoder requirement set 82), vps_dpb_max_temporal_id[dpbIdx] (e.g. the con- straint 94 on the maximum temporal sublayer for the buffer requirement set 84), vps_hrd_max_tid[hrdIdx] (e.g. the con- straint 96 on the maximum temporal sublayer for the bit- stream conformance set 86) for a given OLS 83 are aligned, but this is currently not necessary. These three values that are associated to the same OLS are not currently restricted to have the same value (but may optionally be so in some examples of the present disclosure). ptlIdx, dpbIdx and hrdIdx are indices to the respective syntax structures sig- naled for each OLS.

According to examples of the first embodiment, the value of vps_ptl_max_temporal_id[ptlIdx] is used to set up the variable HTid of the decoding process when not set by external means as follows: When there are no external means to provide to set the value of HTid (e.g. via the decoder API), the value of vps_ptl_max_temporal_id [ptlIdx], is taken by default to set HTid, i.e the minimum of the discussed three syntax elements above. In other words, decoder 50 may set the variable HTid according to the maximum temporal sublayer indication 99 if available, and if not, set HTid to the value of vps_ptl_max_temporal_id [ptlIdx].

According to a second embodiment of the third aspect, decoder 50 infers a maximum temporal sublayer of a set of temporal sublayers to which set each of the pictures 26 of the layers 24 included in the OLS belongs to be the minimum among the maximum temporal sublayers indicated by the bitstream conformance set 86, the buffer requirement set 84 and the decoder requirement set 82 associated with the OLS. For example, the inferred maximum temporal sublayer for the set of temporal sublayers may correspond to, or may be indicated by, the variable max TID WITHINOLS. In other words, the set of temporal sublayers to which each of the pictures of the layers of the OLS belongs may be the set of temporal sublayers accommodating all pictures which belong to the OLS. In this respect, all pictures of a layer included in an OLS may belong to the OLS, e.g., making reference to FIG. 7, an OLS 83 including the first layer 24$_1$ and the second layer 24$_0$ may include the first temporal sublayer to which access units 22$_1$ belong and the second temporal sublayer to which access units 22$_2$ belong.

In examples, decoder 50 may detect for one or more or all layers of the OLS to be decoded whether the video bitstream 14 indicates a constraint on a maximum temporal sublayer for a reference layer on which the respective layer depends. For example, the constraint may indicate that the respective layer depends only on temporal sublayers of the reference layer up to the maximum temporal sublayer. If the video bitstream 14 is not indicative of such constraint, decoder 50 infer that the maximum temporal sublayer included in the OLS equals the maximum temporal sublayer inferred for the set of temporal sublayers to which each of the pictures of the layers of the OLS belongs.

In examples, the OLS indication 81 may further indicate, for the OLS 83 one or more output layers. In other words, one or more of the layers included in the OLS 83 may be indicated as output layers of the OLS 83. Decoder 50 may infer, that for each layer pointed to be an output layer of the OLS 83, a maximum temporal sublayer included in the OLS equals the maximum temporal sublayer inferred for the set of temporal sublayers to which each of the pictures of the layers of the OLS belongs.

Decoder 50 may decode, out of the pictures 26 of the video bitstream 14 those which belong to one of the layers included in the OLS to be decoded and to a temporal sublayer equal to or lower than the maximum temporal sublayer to be decoded. The maximum temporal sublayer to be decoded may be the maximum temporal sublayer inferred for the set of temporal sublayers to which each of the pictures of the layers of the OLS belongs, or the maximum temporal sublayer to be decoded as described with respect to the above embodiment.

In other words, according to the second embodiment, the above described variable MaxTidWithiOIs, indicating the maximum number of temporal sublayers that are present in an OLS (not necessarily the bitstream as some might have been dropped), is derived on decoder side from the minimum of the three values of the syntax elements vps_ptl_max_temporal_id[ptlIdx], vps_dpb_max_temporal_id[dp-bIdx], vps_hrd_max_tid[hrdIdx]. Thereby, sharing of either parameters, PTL, HRD or DPB, is the least restricted and it is prohibited to indicate an OLS for which not all three parameters are defined.

$$MaxTidWithinOls = \min\,(vps\_ptl\_max\_temporal\_id[ptlIdx],$$

$$\min\,(vps\_dpb\_max\_temporal\_id[dpbIdx],\ vps\_hrd\_max\_tid[hrdIdx])).$$

In addition in that embodiment, NumSublayerInLayer[i][j] which represents the maximum sublayer included in the i-th OLS for layer j is set equal to the above derived MaxTidWithinOIs when vps_max_tid_il_ref_pics_plus1[m][k] is not present or layer j is an output layer in the i-th OLS.

According to examples, decoder 50 may infer that a maximum temporal sublayer of the multi-layered video bitstream to be decoded equals the maximum temporal sublayer inferred for the set of temporal sublayers to which each of the pictures of the layers of the OLS belongs, i.e., the one referred to as MaxTidWithinOIs.

In other words, in another embodiment, the derived value of MaxTidWithinOIs can be used to set up the variable HTid of the decoding process when not set by external means as follows: When there are no external means to provide to set the value of HTid (e.g. via the decoder API), the value of MaxTidWithinOIs is taken by default to set HTid, i.e the minimum of the discussed three syntax elements above.

In examples of the embodiments according to the third aspect, decoder 50 selectively considers pictures belonging to one of the temporal layers of the multi-layered video bitstream 14 for decoding, if the respective picture belongs to an access unit 22, which is associated with a temporal sublayer which does not exceed the maximum temporal sublayer to be decoded.

Further embodiments according to the third aspect include an encoder 10, e.g., the encoder 10 of FIG. 1, the encoder 10 being for encoding the multi-layered video bitstream 14 according to FIG. 7. To this end, encoder 10 may form the OLS indication 81 so that, in associating the OLS 83 with the bitstream conformance set 86, the buffer requirement set 84 and the decoder requirement set 82, the minimum among the constraints 96, 94, 92 associated with the respective parameter sets accommodates the subsets of layers indicated by the OLS 83. That is, for example, the minimum among the maximum temporal sublayers indicated by the bitstream conformance set 86, the buffer requirement set 84 and the decoder requirement set 82 associated with the OLS 83 is higher than or equal to a maximum temporal sublayer of temporal sublayers included in the subset of layers indicated by the OLS. Encoder 10 may further form the OLS indication 81 so that parameters within the bitstream conformance set 86, the buffer requirement set 84 and the decoder requirement set 82 are valid for the OLS 83 as far as the parameters refer to temporal sublayers equal to or lower than the minimum among the maximum temporal sublayers 92, 94, 96 indicated for the bitstream conformance set 86, the buffer requirement set 84 and the decoder requirement set 82 associated with the OLS 83.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the video bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

The invention claimed is:

1. A decoder for decoding a video bitstream, the decoder comprising:
   a memory; and
   one or more processors coupled to the memory, the one or more processors configured to perform operations comprising:
   receiving, from the video bitstream, a video parameter set (VPS) including one or more profile tier level parameters, one or more decoded picture buffer (DPB) parameters, and one or more hypothetical reference decoder (HRD) parameters;
   receiving, from the video bitstream, an indication of a maximum temporal sublayer corresponding to the one or more profile tier level parameters, an indication of a maximum temporal sublayer corresponding to the one or more DPB parameters, and an indication of a maximum temporal sublayer corresponding to the one or more HRD parameters; and
   based on determining that an indication of a maximum temporal sublayer of the video bitstream is not available, setting the indication of the maximum temporal sublayer of the video bitstream equal to the indication of the maximum temporal sublayer corresponding to the one or more profile tier level parameters.

2. The decoder of claim 1, the operations further comprising:
   associating an output layer set (OLS) with the one or more profile tier level parameters, the one or more DPB parameters, and the one or more HRD parameters.

3. The decoder of claim 1, the operations further comprising:
   determining that a temporal sublayer of the video bitstream exceeds the maximum temporal sublayer of the video bitstream; and
   based on the determining, omitting decoding the temporal sublayer of the video bitstream.

4. The decoder of claim 1, the operations further comprising:
   determining that a temporal sublayer of the video bitstream does not exceed the maximum temporal sublayer of the video bitstream; and
   based on the determining, decoding the temporal sublayer of the video bitstream.

5. A method of decoding a video bitstream, the method comprising:

receiving, from the video bitstream, a video parameter set (VPS) including one or more profile tier level parameters, one or more decoded picture buffer (DPB) parameters, and one or more hypothetical reference decoder (HRD) parameters;

receiving, from the video bitstream, an indication of a maximum temporal sublayer corresponding to the one or more profile tier level parameters, an indication of a maximum temporal sublayer corresponding to the one or more DPB parameters, and an indication of a maximum temporal sublayer corresponding to the one or more HRD parameters; and based on determining that an indication of a maximum temporal sublayer of the video bitstream is not available, setting the indication of the maximum temporal sublayer of the video bitstream equal to the indication of the maximum temporal sublayer corresponding to the one or more profile tier level parameters.

6. The method of claim 5, further comprising:

associating an output layer set (OLS) with the one or more profile tier level parameters, the one or more DPB parameters, and the one or more HRD parameters.

7. The method of claim 5, further comprising:

determining that a temporal sublayer of the video bitstream exceeds the maximum temporal sublayer of the video bitstream; and based on the determining, omitting decoding the temporal sublayer of the video bitstream.

8. The method of claim 5, further comprising:

determining that a temporal sublayer of the video bitstream does not exceed the maximum temporal sublayer of the video bitstream; and based on the determining, decoding the temporal sublayer of the video bitstream.

9. A non-transitory computer-readable medium storing a computer program for implementing the method of claim 5 when executed on a computer or signal processor.

10. A method of encoding a video bitstream, the method comprising:

providing, in the video bitstream, a video parameter set (VPS) including one or more profile tier level parameters, one or more decoded picture buffer (DPB) parameters, and one or more hypothetical reference decoder (HRD) parameters;

providing, in the video bitstream, an indication of a maximum temporal sublayer corresponding to the one or more profile tier level parameters, an indication of a maximum temporal sublayer corresponding to the one or more DPB parameters, and an indication of a maximum temporal sublayer corresponding to the one or more HRD parameters; and based on determining whether an indication of a maximum temporal sublayer of the video bitstream is equal to the indication of the maximum temporal sublayer corresponding to the one or more profile tier level parameters, omitting or providing in the video bitstream the indication of the maximum temporal sublayer of the video bitstream.

11. The method of claim 10, further comprising:

omitting, in the video bitstream, the indication of the maximum temporal sublayer of the video bitstream when the indication of the maximum temporal sublayer of the video bitstream is determined to equal the indication of the maximum temporal sublayer corresponding to the one or more profile tier level parameters.

12. The method of claim 10, further comprising:

providing, in the video bitstream, the indication of the maximum temporal sublayer of the video bitstream when the indication of the maximum temporal sublayer of the video bitstream is determined to not equal the indication of the maximum temporal sublayer corresponding to the one or more profile tier level parameters.

13. The method of claim 10, further comprising:

associating an output layer set (OLS) with the one or more profile tier level parameters, the one or more DPB parameters, and the one or more HRD parameters.

14. A non-transitory computer-readable medium storing a computer program for implementing the method of claim 10 when executed on a computer or signal processor.

15. An encoder for providing a video bitstream, the encoder comprising:

a memory; and one or more processors coupled to the memory, the one or more processors configured to implement the method of claim 10 when executed by the one or more processors.

\* \* \* \* \*